(12) United States Patent
Coleman et al.

(10) Patent No.: US 8,721,152 B2
(45) Date of Patent: May 13, 2014

(54) LIGHT EMITTING DEVICES AND APPLICATIONS THEREOF

(75) Inventors: Zane Coleman, Chicago, IL (US); John X Zhang, Concord, CA (US); Peter Yi Yan Ngai, Alamo, CA (US); Frank Friedman, Mill Valley, CA (US); James M Young, Alameda, CA (US)

(73) Assignees: ABL IP Holding LLC, Conyers, GA (US); Fusion Optix, Inc., Woburn, MA (US)

( * ) Notice: Subject to any disclaimer, the term of this patent is extended or adjusted under 35 U.S.C. 154(b) by 140 days.

(21) Appl. No.: 12/772,476

(22) Filed: May 3, 2010

(65) Prior Publication Data

US 2011/0013420 A1    Jan. 20, 2011

Related U.S. Application Data

(60) Provisional application No. 61/174,876, filed on May 1, 2009, provisional application No. 61/174,693, filed on May 1, 2009, provisional application No. 61/174,784, filed on May 1, 2009, provisional application No. 61/174,815, filed on May 1, 2009, provisional application No. 61/174,831, filed on May 1, 2009, provisional application No. 61/174,849, filed on May 1, 2009, provisional application No. 61/174,861, filed on May 1, 2009.

(51) Int. Cl.
*F21V 7/04* (2006.01)
*F21S 4/00* (2006.01)
*F21V 3/00* (2006.01)

(52) U.S. Cl.
USPC ........... 362/617; 362/628; 362/633; 362/555; 362/249.02; 362/311.02

(58) Field of Classification Search
USPC ........ 362/555, 249.02, 311.02, 617, 628, 633
See application file for complete search history.

(56) References Cited

U.S. PATENT DOCUMENTS

| | | | |
|---|---|---|---|
| 4,377,616 A | 3/1983 | Ashcraft et al. |
| 4,767,675 A | 8/1988 | Cyr et al. |
| 5,141,685 A | 8/1992 | Maier et al. |
| 5,188,777 A | 2/1993 | Joesten et al. |
| 5,237,341 A | 8/1993 | Iwagami et al. |
| 5,237,641 A | 8/1993 | Jacobson et al. |
| 5,268,225 A | 12/1993 | Isayev |
| 5,275,854 A | 1/1994 | Maier et al. |
| 5,594,830 A | 1/1997 | Winston et al. |
| 5,672,409 A | 9/1997 | Miyakawa et al. |

(Continued)

OTHER PUBLICATIONS

U.S. Appl. No. 12/772,435, filed May 3, 2010 Office Action mailed Sep. 24, 2012, 21 pages.

(Continued)

*Primary Examiner* — Jong-Suk (James) Lee
*Assistant Examiner* — Bryon T Gyllstrom
(74) *Attorney, Agent, or Firm* — Kilpatrick Townsend & Stockton LLP

(57) ABSTRACT

In one aspect, the present invention provides light emitting devices, including light fixtures and luminaires. In some embodiments, a light emitting device comprises at least one light source, a lightguide operable to receive light from the at least one light source at a first location on the lightguide, at least one light extraction region optically coupled to the lightguide and a substantially non-scattering region along a portion of the lightguide.

46 Claims, 31 Drawing Sheets

(56) References Cited

U.S. PATENT DOCUMENTS

| | | | |
|---|---|---|---|
| 5,688,035 | A | 11/1997 | Kashima et al. |
| 5,803,579 | A | 9/1998 | Turnbull et al. |
| 5,825,543 | A | 10/1998 | Ouderkirk et al. |
| 5,843,578 | A | 12/1998 | Sasaki et al. |
| 5,867,316 | A | 2/1999 | Carlson et al. |
| 5,932,342 | A | 8/1999 | Zeira et al. |
| 6,004,664 | A | 12/1999 | Sasaki et al. |
| 6,099,135 | A | 8/2000 | Oda et al. |
| 6,117,530 | A | 9/2000 | Jonza et al. |
| 6,130,278 | A | 10/2000 | Hibiya et al. |
| 6,161,939 | A | 12/2000 | Bansbach |
| 6,177,153 | B1 | 1/2001 | Uchiyama et al. |
| 6,215,409 | B1 * | 4/2001 | Blach .......................... 340/815.4 |
| 6,228,313 | B1 | 5/2001 | Miki |
| 6,272,265 | B1 * | 8/2001 | Franklin .......................... 385/31 |
| 6,294,983 | B1 * | 9/2001 | Lee .............................. 340/332 |
| 6,317,263 | B1 | 11/2001 | Moshrefzadeh et al. |
| 6,346,311 | B1 | 2/2002 | Yeo et al. |
| 6,347,873 | B1 | 2/2002 | Hosseini et al. |
| 6,379,016 | B1 | 4/2002 | Boyd et al. |
| 6,447,135 | B1 | 9/2002 | Wortman et al. |
| 6,481,882 | B1 | 11/2002 | Pojar |
| 6,486,790 | B1 * | 11/2002 | Perlo et al. ............... 340/815.45 |
| 6,497,946 | B1 | 12/2002 | Kretman et al. |
| D474,509 | S * | 5/2003 | Kim, II .......................... D20/42 |
| 6,567,215 | B2 | 5/2003 | Ballen et al. |
| 6,673,275 | B1 | 1/2004 | Allen et al. |
| 6,773,801 | B2 | 8/2004 | Hattori |
| 6,789,910 | B2 | 9/2004 | Kimura et al. |
| 6,795,244 | B2 | 9/2004 | Jagt et al. |
| 6,829,071 | B2 | 12/2004 | Allen et al. |
| 6,867,927 | B2 | 3/2005 | Bourdelais et al. |
| 6,917,396 | B2 | 7/2005 | Hiraishi et al. |
| 6,924,014 | B2 | 8/2005 | Ouderkirk et al. |
| 6,940,643 | B2 | 9/2005 | Ma et al. |
| 6,945,668 | B1 | 9/2005 | Orlov et al. |
| 7,038,745 | B2 | 5/2006 | Weber et al. |
| 7,046,905 | B1 | 5/2006 | Gardiner et al. |
| 7,108,414 | B2 | 9/2006 | McCollum et al. |
| 7,132,136 | B2 | 11/2006 | Laney et al. |
| 7,192,174 | B2 | 3/2007 | Myoung |
| 7,210,839 | B2 * | 5/2007 | Jung et al ....................... 362/612 |
| 7,213,940 | B1 | 5/2007 | Van De Ven et al. |
| 7,226,197 | B2 | 6/2007 | Hayashi et al. |
| 7,273,640 | B2 | 9/2007 | Laney et al. |
| 7,278,775 | B2 | 10/2007 | Yeo et al. |
| 7,278,785 | B2 | 10/2007 | Fadler et al. |
| 7,290,914 | B2 * | 11/2007 | Yang .............................. 362/555 |
| 7,322,732 | B2 | 1/2008 | Negley et al. |
| 7,334,932 | B2 * | 2/2008 | Klettke .......................... 362/612 |
| 7,408,702 | B2 | 8/2008 | Krylov et al. |
| 7,431,489 | B2 | 10/2008 | Yeo et al. |
| 7,542,635 | B2 | 6/2009 | Coleman |
| 7,766,531 | B2 | 8/2010 | Anderson et al. |
| 7,821,023 | B2 | 10/2010 | Yuan et al. |
| 8,068,187 | B2 | 11/2011 | Huizinga et al. |
| 8,092,063 | B2 | 1/2012 | Isoda |
| 2004/0135273 | A1 | 7/2004 | Parker et al. |
| 2005/0063174 | A1 | 3/2005 | Kaminsky et al. |
| 2005/0105186 | A1 | 5/2005 | Kaminsky et al. |
| 2005/0162863 | A1 * | 7/2005 | Iwasaki .......................... 362/551 |
| 2005/0265044 | A1 * | 12/2005 | Chen et al. ..................... 362/558 |
| 2006/0028844 | A1 | 2/2006 | Parker et al. |
| 2006/0044824 | A1 * | 3/2006 | Chen .............................. 362/583 |
| 2006/0187676 | A1 * | 8/2006 | Ishikura .......................... 362/615 |
| 2006/0290253 | A1 | 12/2006 | Yeo et al. |
| 2007/0139923 | A1 | 6/2007 | Negley et al. |
| 2007/0153545 | A1 * | 7/2007 | Lee ................................. 362/610 |
| 2007/0285941 | A1 * | 12/2007 | Ishihara et al. ................ 362/606 |
| 2007/0297190 | A1 * | 12/2007 | Ng ................................. 362/558 |
| 2008/0043490 | A1 | 2/2008 | Coleman et al. |
| 2008/0089093 | A1 | 4/2008 | Miller et al. |
| 2008/0106895 | A1 | 5/2008 | Van De Ven et al. |
| 2008/0130282 | A1 | 6/2008 | Negley |
| 2008/0136313 | A1 | 6/2008 | Van De Ven et al. |
| 2008/0211416 | A1 | 9/2008 | Negley et al. |
| 2008/0304288 | A1 * | 12/2008 | Iwasaki .......................... 362/632 |
| 2009/0086504 | A1 | 4/2009 | Kim |
| 2010/0296025 | A1 | 11/2010 | Gourlay |
| 2010/0321952 | A1 | 12/2010 | Coleman et al. |
| 2010/0321953 | A1 | 12/2010 | Coleman et al. |

OTHER PUBLICATIONS

U.S. Appl. No. 12/772,395, filed May 3, 2010 Office Action mailed Oct. 12, 2012, 6 pages.
U.S. Appl. No. 12/772,395 Non-Final Office Action mailed May 31, 2013, 17 pages.
U.S. Appl. No. 12/772,435 Final Office Action mailed Mar. 13, 2013, 23 pages.
Canadian Patent Application No. 2702690 Office Action mailed Apr. 4, 2012, 3 pages.
Canadian Patent Application No. 2702690 Office Action Response filed Sep. 4, 2012, 63 pages.
Canadian Patent Application No. 2702690 Notice of Allowance mailed Dec. 5, 2012, 1 page.
Canadian Patent Application No. 2702600 Office Action mailed Apr. 3, 2012, 3 pages.
Canadian Patent Application No. 2702600 Office Action Response filed Sep. 27, 2012, 22 pages.
Canadian Patent Application No. 2702600 Notice of Allowance mailed Jan. 17, 2013, 3 pages .
Canadian Patent Application No. 2702685 Office Action mailed Apr. 5, 2012, 3 pages.
Canadian Patent Application No. 2702685 Office Action Response filed Sep. 27, 2012, 43 pages.
Canadian Patent Application No. 2702685 Notice of Allowance mailed Nov. 22, 2012, 1 page.
U.S. Appl. No. 12/772,395, Non-Final Office Action mailed Jan. 14, 2014, 9 pages.
U.S. Appl. No. 12/772,435, Non-Final Office Action mailed Dec. 16, 2013, 23 pages.

* cited by examiner

IESNA:LM-63-1995

[LUMINAIRE] 10 1/2" W X 1 1/2"H WITH 5" x 18.5" FILM FLOAT LUMINAIRE
6X8 ARRAY 58C ON HEATSINK 2070/62.01 = 33.3lm/w

SUMMARY DATA

| | |
|---|---|
| EFFICIENCY (Total): | 57.5 % |
| EFFICIENCY (Downlight): | 19.4 % |
| EFFICIENCY (Uplight): | 38.2 % |
| CIE CLASSIFICATION: | SEMI-INDIRECT |
| SPACING CRITERION (0-Deg.): | 1.79 |
| SPACING CRITERION (90-Deg.): | 1.87 |
| LUMENS/LAMP: | 3600 |
| NO. OF LAMPS: | 1 |
| LUMINOUS OPENING: | RECTANGULAR |
| Width: | 0.10 (Feet) |
| Length: | 2.00 |
| Height: | 0.00 |
| INPUT WATTS: | 62 |

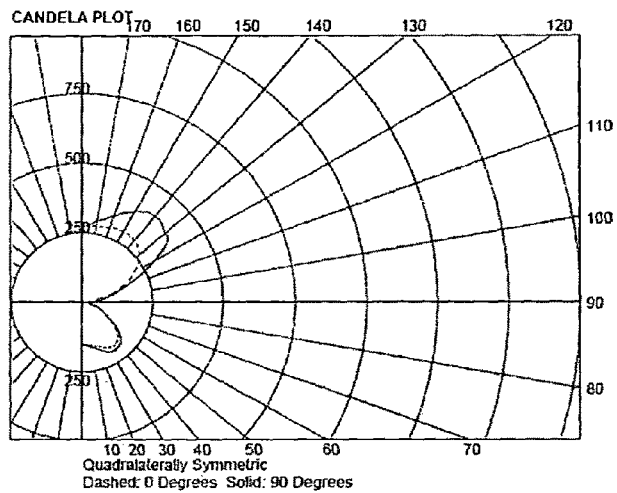

Quadralaterally Symmetric
Dashed: 0 Degrees  Solid: 90 Degrees

ZONAL LUMEN SUMMARY

| Zone | Lumens | % Lamp | % Luminaire |
|---|---|---|---|
| 0 - 30 | 149.8 | 4.2 | 7.2 |
| 0 - 40 | 273.6 | 7.6 | 13.2 |
| 0 - 60 | 537.8 | 14.9 | 26.0 |
| 60 - 90 | 158.9 | 4.4 | 7.7 |
| 0 - 90 | 696.7 | 19.4 | 33.6 |
| 90 - 180 | 1374.7 | 38.2 | 66.4 |
| 0 - 180 | 2071.4 | 57.5 | 100.0 |

AVERAGE LUMINANCE
(Candelas / Square Meter)

| Angle | 0 | 22.5 | 45 | 67.5 | 90 |
|---|---|---|---|---|---|
| 0 | 8342 | 8342 | 8342 | 8342 | 8342 |
| 45 | 13700 | 13472 | 13776 | 14309 | 14690 |
| 55 | 12573 | 13136 | 12855 | 13230 | 13230 |
| 65 | 9806 | 12989 | 10315 | 10315 | 10443 |
| 75 | 5614 | 14348 | 7278 | 7278 | 7278 |
| 85 | 2470 | 30258 | 8645 | 11733 | 14820 |

COEFFICIENT OF UTILIZATION TABLE

Effective Floor Cavity Reflectance = 20%

| Pcc | 80 | | | | 70 | | | | 50 | | | 30 | | | 10 | | | 0 |
|---|---|---|---|---|---|---|---|---|---|---|---|---|---|---|---|---|---|---|
| Pw | 70 | 50 | 30 | 10 | 70 | 50 | 30 | 10 | 50 | 30 | 10 | 50 | 30 | 10 | 50 | 30 | 10 | 0 |
| RCR | | | | | | | | | | | | | | | | | | |
| 0 | .59 | .59 | .59 | .59 | .54 | .54 | .54 | .54 | .43 | .43 | .43 | .33 | .33 | .33 | .24 | .24 | .24 | .19 |
| 1 | .54 | .51 | .49 | .47 | .49 | .46 | .44 | .43 | .37 | .36 | .34 | .28 | .28 | .27 | .20 | .20 | .19 | .16 |
| 2 | .49 | .45 | .41 | .38 | .44 | .40 | .37 | .35 | .32 | .30 | .28 | .25 | .23 | .22 | .18 | .17 | .16 | .13 |
| 3 | .45 | .39 | .35 | .32 | .40 | .35 | .32 | .29 | .28 | .26 | .24 | .22 | .20 | .18 | .16 | .15 | .14 | .11 |
| 4 | .41 | .34 | .30 | .26 | .36 | .31 | .27 | .24 | .25 | .22 | .20 | .19 | .17 | .16 | .14 | .13 | .11 | .09 |
| 5 | .37 | .30 | .26 | .22 | .33 | .28 | .24 | .21 | .22 | .19 | .17 | .17 | .15 | .13 | .12 | .11 | .10 | .08 |
| 6 | .34 | .27 | .23 | .19 | .31 | .25 | .21 | .18 | .20 | .17 | .15 | .15 | .13 | .11 | .11 | .10 | .09 | .07 |
| 7 | .31 | .24 | .20 | .17 | .28 | .22 | .18 | .15 | .18 | .15 | .13 | .14 | .12 | .10 | .10 | .09 | .07 | .06 |
| 8 | .29 | .22 | .18 | .15 | .26 | .20 | .16 | .13 | .16 | .13 | .11 | .13 | .10 | .09 | .09 | .08 | .07 | .05 |
| 9 | .27 | .20 | .16 | .13 | .24 | .18 | .14 | .12 | .15 | .12 | .10 | .11 | .09 | .08 | .08 | .07 | .06 | .04 |
| 10 | .25 | .18 | .14 | .11 | .23 | .17 | .13 | .10 | .13 | .11 | .09 | .10 | .08 | .07 | .08 | .06 | .05 | .04 |

FIG. 8

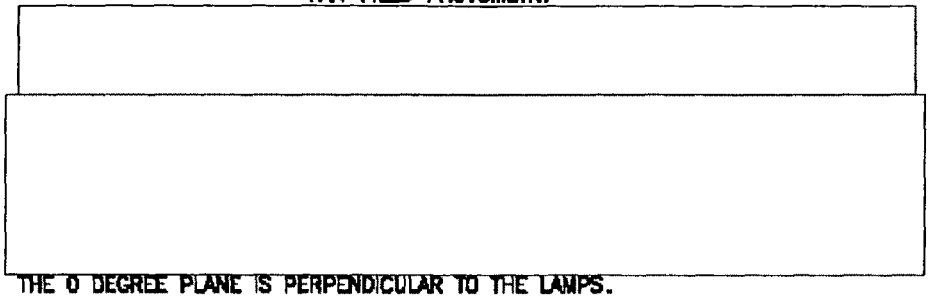
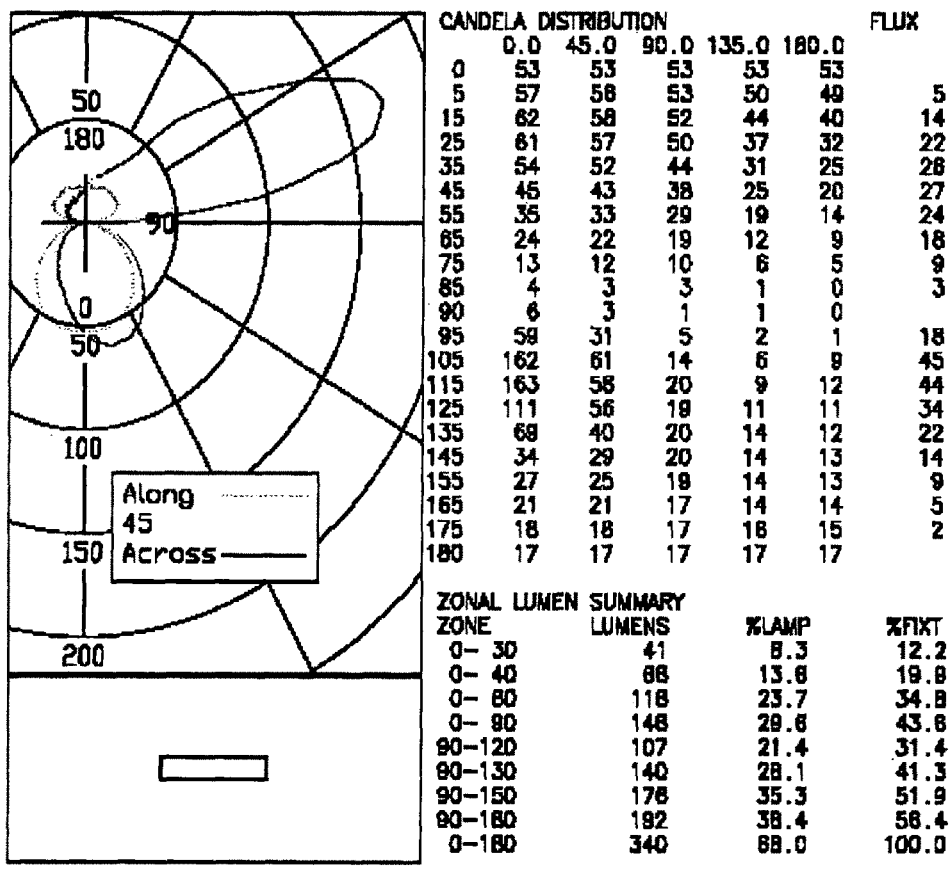
FIG. 12

| CANDELA DISTRIBUTION | | | | | FLUX |
|---|---|---|---|---|---|
| 0.0 | 22.5 | 45.0 | 67.5 | 90.0 | |
| 0   247 | 247 | 247 | 247 | 247 |     |
| 5   247 | 251 | 252 | 240 | 252 | 24  |
| 15  247 | 252 | 257 | 252 | 260 | 72  |
| 25  243 | 250 | 258 | 255 | 267 | 118 |
| 35  231 | 240 | 250 | 253 | 269 | 156 |
| 45  210 | 217 | 229 | 240 | 254 | 177 |
| 55  176 | 180 | 190 | 212 | 218 | 174 |
| 65  131 | 130 | 136 | 170 | 163 | 144 |
| 75   73 | 72  | 74  | 120 | 93  | 92  |
| 85   12 | 14  | 9   | 62  | 7   | 30. |
| 90    1 | 1   | 1   | 58  | 1   |     |
| 95   10 | 14  | 8   | 8   | 7   | 15  |
| 105  74 | 74  | 79  | 93  | 99  | 87  |
| 115 132 | 133 | 142 | 158 | 166 | 143 |
| 125 172 | 175 | 186 | 203 | 209 | 168 |
| 135 195 | 200 | 210 | 224 | 228 | 163 |
| 145 203 | 209 | 217 | 227 | 230 | 136 |
| 155 204 | 209 | 214 | 218 | 220 | 99  |
| 165 203 | 206 | 208 | 209 | 210 | 59  |
| 175 200 | 202 | 203 | 204 | 204 | 19  |
| 180 202 | 202 | 202 | 202 | 202 |     |

| ZONAL LUMEN SUMMARY | | | |
|---|---|---|---|
| ZONE | LUMENS | %LAMP | %FIXT |
| 0- 30 | 213 | 8.8 | 11.4 |
| 0- 40 | 369 | 15.2 | 19.7 |
| 0- 60 | 720 | 29.7 | 38.4 |
| 0- 90 | 987 | 40.7 | 52.6 |
| 90-120 | 246 | 10.1 | 13.1 |
| 90-130 | 414 | 17.1 | 22.1 |
| 90-150 | 714 | 29.4 | 38.0 |
| 90-180 | 891 | 36.7 | 47.4 |
| 0-180 | 1878 | 77.3 | 100.0 |

TOTAL LUMINAIRE EFFICIENCY = 77.3 %
CIE TYPE - GENERAL DIFFUSE

LIGHT EMITTING DEVICES AND APPLICATIONS THEREOF

RELATED APPLICATION DATA

The present application hereby claims priority under 35 U.S.C. §119(e) to U.S. Provisional Patent Application Ser. Nos. 61/174,876, 61/174,693, 61/174,784, 61/174,815, 61/174,831, 61/174,849 and 61/174,861, each of which is incorporated herein by reference in its entirety.

FIELD OF THE INVENTION

This invention generally relates to optical components and light emitting devices comprising optical components for illumination and, in particular, to luminaires of various constructions.

BACKGROUND OF THE INVENTION

Edge-illuminated lightguides have been used in backlights for LCDs and more recently for light fixtures. However, traditional designs using planar lightguides such as used with LCDs have angular output, thermal, uniformity, efficiency, and form factor limitations.

SUMMARY

In one aspect, the present invention provides light emitting devices. In some embodiments, a light emitting device comprises at least one light source, a lightguide operable to receive light from the at least one light source at a first location on the lightguide, at least one light extraction region optically coupled to the lightguide and a substantially non-scattering region along a portion of the lightguide.

In some embodiments, a light emitting device comprises at least one light source, a lightguide operable to receive light from the at least one light source at a first location on the lightguide, at least one light extraction region optically coupled to the lightguide, a substantially non-scattering region along a portion of the lightguide and a light emitting region positioned to receive at least a portion of light extracted from the lightguide by the light extraction region, wherein the light emitting device has a direct light output and an indirect light output.

A light emitting device, in some embodiments, comprises at least one light source, a lightguide operable to receive light from the at least one light source at a first location on the lightguide, at least one light extraction region optically coupled to the lightguide, a substantially non-scattering region along a portion of the lightguide and a light emitting region positioned to receive at least a portion of light extracted from the lightguide by the light extraction region, wherein a percentage of the total luminous flux of the light emitting device in a vertical range of 0° to 30° ranges from about 0 to about 15.

In some embodiments, a light emitting device comprises at least one light source, a lightguide operable to receive light from the at least one light source at a first location on the lightguide, at least one light extraction region optically coupled to the lightguide and a substantially non-scattering region along a portion of the lightguide having a first total width in a first direction parallel to the optical axis of the at least one light source greater than 5% of the total width of the lightguide in the first direction.

In some embodiments wherein the lightguide is curved, the optical axis of the at least one light source is parallel or substantially parallel with at least one curved surface of the lightguide.

A light emitting device, in some embodiments, comprises a first light source and a second light source, the first light source and the second light source separated by a distance D, a lightguide operable to receive light from the first light source at a first location on the lightguide and light from the second light source at a second location on the lightguide, at least one light extraction region optically coupled to the lightguide, at least one light blocking region at least partially covering a surface of the lightguide, and a substantially non-scattering region of a width W along a portion of the lightguide between the light blocking region and the light extraction region, wherein a ratio of W/D is greater than 1.

In another aspect, the present invention provides methods of lighting a surface. In some embodiments, a method of lighting a surface comprises providing a light emitting device comprising at least one light source, a lightguide operable to receive light from the at least one light source at a first location on the lightguide, at least one light extraction region optically coupled to the lightguide, a light emitting region and a substantially non-scattering region along a portion of the lightguide, transmitting light from the lightsource into the lightguide and extracting at least a portion of light from the lightguide for emission from the light emitting device through the light emitting region to the surface.

In some embodiments, a method of lighting a surface comprises providing a light emitting device comprising at least one light source, a lightguide operable to receive light from the at least one light source at a first location on the lightguide, at least one light extraction region optically coupled to the lightguide, a light emitting region and a substantially non-scattering region along a portion of the lightguide, transmitting light from the lightsource into the lightguide, extracting a first portion of light from the lightguide for emission from the light emitting device as an indirect light output and extracting a second portion of the light from the lightguide for emission from the light emitting device as a direct light output.

These and other embodiments are described in more detail in the detailed description which follows.

BRIEF DESCRIPTION OF THE DRAWINGS

FIG. 8 is a photometric report of the output from a light fixture of one embodiment of this invention.

FIG. 12 is a photometric report of the output from a light fixture of the type shown in FIG. 11.

DETAILED DESCRIPTION OF THE INVENTION

Figure 1:
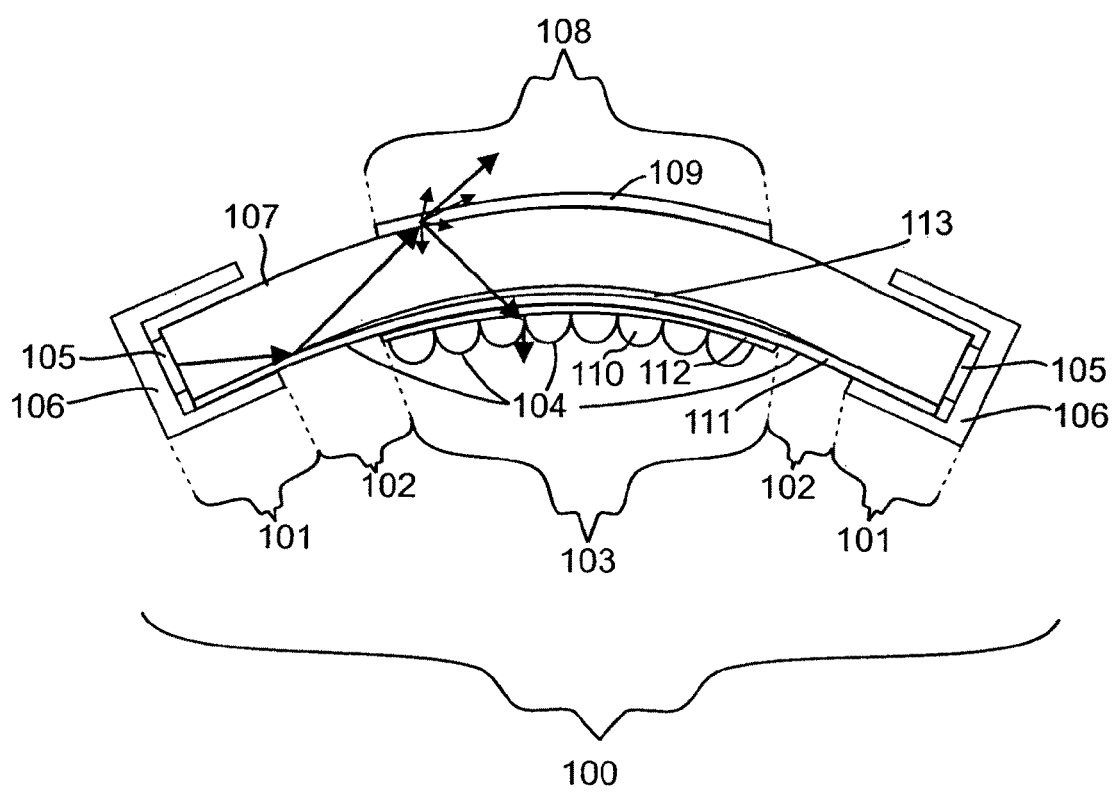
FIG. 1 is a cross-sectional side view of a light fixture in accordance with one embodiment of this invention.

The features and other details of the invention will now be more particularly described with reference to the accompanying drawings, in which embodiments of the inventive subject matter are shown. It will be understood that particular embodiments described herein are shown by way of illustration and not as limitations of the invention. However, this inventive subject matter should not be construed as limited to the embodiments set forth herein. The principal features of this invention can be employed in various embodiments without departing from the scope of the invention. All parts and percentages are by weight unless otherwise specified. All patent applications and patents referenced herein are incorporated by reference.

The terminology used herein is for the purpose of describing particular embodiments only and is not intended to be limiting of the inventive subject matter. Like numbers refer to like elements throughout. As used herein the term "and/or" includes any and all combinations of one or more of the associated listed items. Also, as used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

DEFINITIONS

For convenience, certain terms used in the specification and examples are collected here.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between at least one of the regions or layers such as Optically Clear Adhesive 8161 from 3M (with a refractive index at 633 nm of 1.474). Examples of optically coupling include lamination using an index-matched optical adhesive such as a pressure sensitive adhesive; lamination using a UV curable transparent adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Diffusion angle" is a measurement of the angular diffusion profile of the intensity of light within a plane of emitted light. Typically the diffusion angle is defined according to an angular Full-Width-at-Half-Maximum (FWHM) intensity defined by the total angular width at 50% of the maximum intensity of the angular light output profile. For diffusive films and sheets, this is typically measured with collimated light at a specific wavelength or white light incident normal to the film. Typically, for anisotropic diffusers, the FWHM values are specified in two orthogonal planes such as the horizontal and vertical planes orthogonal to the plane of the film. For example, if angles of +35° and −35° were measured to have one-half of the maximum intensity in the horizontal direction, the FWHM diffusion angle in the horizontal direction for the diffuser would be 70°. Similarly, the full-width at one-third maximum and full-width at one-tenth maximum can be measured from the angles at which the intensity is one-third and one-tenth of the maximum light intensity respectively.

The "asymmetry ratio" is the FWHM diffusion angle in a first light exiting plane divided by the FWHM diffusion angle in a second light exiting plane orthogonal to the first, and thus is a measure of the degree of asymmetry between the intensity profile in two orthogonal planes of light exiting the diffuser.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Ellipsoidal particles can range in shapes from squashed or stretched spheres to very long filament like shapes.

A "spherical" or "symmetric" disperse phase domain includes gaseous voids, micro-bodies, or particles that substantially resemble a sphere. A spherical domain may contain surface incongruities and irregularities but has a generally circular cross-section in substantially all directions. A "spheroid" is a type of ellipsoid wherein two of the three axes are equal. An "asymmetric" domain is referred to here as an "ellipsoidal" domain wherein each of the three axis can be a different length. Typically, ellipsoidal domains resemble squashed or stretched spheres. "Non-spherical" domains include ellipsoidal domains and other domains defined by shapes that do not resemble a sphere such as those that not have constant radii. For example, a non-spherical particle may have finger-like extensions within one plane (amoeba-like) and substantially planar in a perpendicular plane. Also, fibrous domains are also non-spherical disperse phase domains that may have aspect ratios of 10:1, 100:1 or larger.

"Light guide" or "waveguide" refers to a region bounded by the condition that light rays traveling at an angle that is larger than the critical angle will reflect and remain within the region. In a light guide, the light will reflect or TIR (totally internally reflect) if it the angle (α) from the surface normal does not satisfy the condition $$\alpha < \sin^{-1}\left(\frac{n_2}{n_1}\right)$$

where $n_1$ is the refractive index of the medium inside the light guide and $n_2$ is the refractive index of the medium outside the light guide. Typically, $n_2$ is air with a refractive index of $n \approx 1$, however, high and low refractive index materials can be used to achieve light guide regions. The light guide may comprise reflective components such as reflective films, aluminized coatings, surface relief features, and other components that can re-direct or reflect light. The light guide may also contain non-scattering regions such as substrates. Light can be incident on a light guide region from the sides or below and surface relief features or light scattering domains, phases or elements within the region can direct light into larger angles such that it totally internally reflects into smaller angles such that the light escapes the light guide. The light guide does not need to be optically coupled to all of its components to be considered as a light guide. Light may enter from any face (or interfacial refractive index boundary) of the waveguide region and may totally internally reflect from the same or another refractive index interfacial boundary. A region can be functional as a waveguide for purposes illustrated herein as long as the thickness is larger than the wavelength of light of interest. For example, a light guide may be a 5 micron region with 2 micron×3 micron ellipsoidal dispersed particles or it may be a 3 millimeter diffuser plate with 2.5 micron×70 micron dispersed phase particles.

A "luminophor" emits light when it becomes excited. The expression "excited" means that at least some electromagnetic radiation (e.g., visible light, UV light or infrared light) is contacting the luminophor, causing the luminophor to emit at least some light. The expression "excited" encompasses situations where the luminophor emits light continuously or intermittently at a rate such that a human eye would perceive it as emitting light continuously, or where a plurality of luminophors of the same color or different colors are emitting light intermittently and/or alternatingly (with or without overlap in "on" times) in such a way that a human eye would perceive them as emitting light continuously (and, in cases where different colors are emitted, as a mixture of those colors).

In one embodiment of this invention, a light emitting device comprises a lightguide, a light extracting region, and a non-scattering region. In another embodiment of this invention, the light emitting device further comprises a light redirecting element disposed to receive and redirect a first portion of light extracted from the lightguide. In a further embodiment of this invention, the lightguide is curved and the light redirecting element redirects a first portion of light from a first angular range from the normal to the light output surface of the light emitting device to a second light output angular range from the normal to the light output surface wherein the second light output angular range is smaller than the first angular range. In a further embodiment of this invention, the light emitting device further comprises a light blocking region and a substantially non-scattering light transmitting region. In a further embodiment of this invention, the light extracting region is a volumetric light scattering element optically coupled in a first region to the lightguide. In another embodiment of this invention, the volumetric light scattering material has a angular full-width at half-maximum intensity when illuminated with collimated incident light in a first output plane of at least 5°. In some embodiments, the volumetric light scattering material has a angular full-width at half-maximum intensity when illuminated with collimated incident light in a first output plane of one selected from the group of 0° to 10°, 10° to 20°, 20° to 30°, 30° to 40°, 40° to 50°, 50° to 60°, 60° to 70°, 70° to 80°, 80° to 90°, and 90° to 100°. 0° to 10°, 10° to 20°, 20° to 30°, 30° to 40°, 40° to 50°, 50° to 60°, 60° to 70°, 70° to 80°, 80° to 90°, and 90° to 100°. In one embodiment of this invention, the volumetric light scattering material symmetrically scatters incident light such that the angular FWHM in a first light output plane is substantially the same as the angular FWHM in a second light output plane orthogonal to the first light output plane. In another embodiment of this invention, the volumetric light scattering material asymmetrically scatters incident light such that the asymmetry ratio is greater than 1.05.

Light Source

In one embodiment of this invention, the light emitting device comprises at least one light source selected from the group of: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source and other solid state light emitters including inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art. In one embodiment of this invention, the light source is a transparent OLED such as those produced by Universal Display Corporation. In a further embodiment of this invention, at least one of the light transmitting regions (or material) comprises a phosphor or phosphorescent material and the light source emits light capable of exciting the phosphor.

In one embodiment of this invention, a light emitting device comprises at least one light source that is pulsed to two different power output levels at a sufficiently high frequency such that the output is perceived as constant. In a further embodiment of this invention, a light emitting device comprises at least one light source that is pulsed at a rate higher than one selected from 15 hertz, 30 hertz, 60 hertz, 120 hertz, 200 hertz, and 400 hertz.

Multiple Light Sources

More than one light source may be used in an array, grouping or arrangement where the source types, spectral output, color, angular output, output flux, spatial locations or orientations of the light sources may vary in one or more directions, planes or surfaces in a predetermined, random, quasi-random, regular or irregular manner. In one embodiment of this invention, the light emitting device comprises more than one light source arranged in at least one pattern selected from linear array, co-linear arrays, cylindrical arrays, spherical arrays, circular array, two-dimensional array, three-dimensional array, varying height array, angle of orientation varying array, opposing arrays oriented in substantially opposite directions and arrays oriented along a surface. Arrays of light sources such as LEDs can be configured as disclosed in U.S. Pat. No. 7,322,732, and U.S. patent application Ser. Nos. 12/017,600, 12/154,691, 11/613,692, the contents of each are incorporated by reference herein.

In one embodiment of this invention, a light emitting device comprises an array of light sources disposed on at least one of a circuit board, connecting surface, flexible connecting surface, heat-sink, metal substrate, copper substrate, aluminum substrate, lightguide, or polymer substrate.

Light Source Spectral Output

In one embodiment of this invention, a light emitting device comprises light sources wherein the spectral output the light source or group of sources is narrowband or broadband. The light source color may be a primary color, non-primary color, white, cool white, warm white or other color in the visible, ultraviolet, or infrared spectrum. Various combinations of light sources of different spectral properties may be used to provide desired spectral output in an angular range or spatial region or for all or a portion of the total light output of the light emitting device. Spectral properties of the light emitting region or the light emitted from the light emitting device may include overlapping first and second spectral properties (corresponding to first and second colors, respectively), such that a third color is perceived with third spectral properties. The overlap may occur spatially, such as in the case of a red and blue LED illuminating the same region of a diffuser that appears purple. Also, the overlap may occur in time such as a red and blue LED flashed sufficiently fast that the perceived color is purple. Combinations of different spectral sources in a light emitting device include those discussed in U.S. Pat. Nos. 5,803,579 and 7,213,940, and U.S. patent application Ser. Nos. 11/936,163, 11/951,626, the contents of which are incorporated by reference herein.

In one embodiment of this invention, the light source emits light of a substantially single color (a full wavelength bandwidth at have maximum intensity of less than 40 nanometers for example). In another embodiment of this invention, the light emitting device (or the light source within a light emitting device) includes a light emitting region and a wavelength conversion material such as a luminophor. The luminophor may be a fluorophore, a phosphor, or other chemical compound that manifests luminescence such as transition metal complexes (ruthenium tris-2'2'-bipyridine). In another embodiment of this invention, a light emitting device comprises at least one wavelength conversion material that is a non-linear optical material such that a first portion of incident light undergoes second harmonic generation (SHG), sum frequency generation (SFG), third harmonic generation (THG), difference frequency generation (DFG), parametric amplification, parametric oscillation, parametric generation, spontaneous parametric down conversion (SPDC), optical retification, or four-wave mixing (FWM). Examples of non-linear optical materials are known in the photonics industry and include potassium niobate, lithium iodate, gallium selenide. The wavelength conversion material may be located in or on one or more surfaces or elements within the light emitting device or within the light source packaging, such as a phosphor material deposited on or in a light scattering lens of a light emitting device or deposited near the die of an LED or within the LED package. Alternatively, the wavelength conversion material may be located remotely or outside the light source packaging, as in the case of some remote phosphors and phosphor films.

Lightguide

In one embodiment of this invention, a lightguide comprises a light extracting region. A lightguide is a region bounded by the condition that light rays traveling at an angle that is larger than the critical angle will reflect and remain within the region. Thus, a lightguide region of a material or materials is capable of supporting a significant number of multiple internal reflections of light due to the refractive index difference between the material and the surrounding material. Typically, a lightguide or waveguide is comprised of a polymer or glass and the surrounding material is air or a cladding material with a lower refractive index. A lightguide may be formed from a light transmitting material. The lightguide may contain materials or regions within the volume that will scatter, reflect, refract, or absorb re-emit a first portion of light into an angular condition such that it escapes the lightguide. In one embodiment of this invention, a lightguide comprises a substantially transparent, non-scattering polymer optically coupled to a light scattering material in one or more regions. The light scattering material can be a volumetric scattering region or film, a surface relief region or film, or a combination thereof. In another embodiment of this invention, the lightguide is a film or sheet comprising a matrix material and light scattering domains dispersed substantially throughout the film or sheet. In another embodiment of this invention, the lightguide comprises a substantially non-scattering region and a volumetric light scattering region, or other combination of regions as discussed in U.S. patent application Ser. Nos. 11/426,198, 11/848,759, 11/957,406, 12/122,661 and U.S. Pat. Nos. 7,431,489, 7,278,785, 6,924,014, 6,379,016, 5,237,641, and 5,594,830, the contents of which are incorporated by reference herein. In one embodiment of this invention, a light emitting device comprises a "hollow lightguide". Examples of "hollow lightguides" are discussed in U.S. Pat. No. 6,481,882, the contents of which are incorporated by reference herein. In another embodiment of this invention, a light emitting device comprises a fluted lightguide. Examples of fluted lightguides are discussed in U.S. Pat. No. 6,481,882, the contents of which are incorporated by reference herein. In another embodiment of this invention, a light emitting device comprises a lightguide with grooves or surface relief structures on at least one surface. Examples of surface relief structures including grooves on lightguides are discussed in U.S. Pat. No. 7,046,905, the contents of which are incorporated by reference herein. Other types of lightguides are known in the backlighting industry and optical fiber industries.

Typically, a lightguide extends longer in a first direction than a second direction orthogonal to the first. In these cases and in the notation used herein, the length, L, is the dimension of the lightguide in the first direction and width, W, is the length of the dimension of the lightguide in the second direction orthogonal to the first. A lightguide can have any desired length or width. In some embodiments, a lightguide has a width of at least about 0.5 inches. In some embodiments, a lightguide has a width of at least about 1 inch or at least about 5 inches. A lightguide in some embodiments, has a length of at least about 1 inch. In some embodiments, a lightguide has a length of at least about 12 inches, at least about 24 inches, at least about 36 inches or at least about 48 inches. In some embodiments, a lightguide is a square, rectangular or other polygonal panel. In some embodiments, a lightguide is a planar panel or a curved panel.

The light may enter the lightguide through any number or combination of surfaces of the lightguide. Light may enter through the edge (edge-surface), larger surface, or through a light coupling element optically coupled to one or more surfaces of the lightguide.

Lightguide Shape

The lightguide of one embodiment of this invention is substantially planar in shape. In another embodiment of this invention the lightguide is substantially curved along at least one direction. A curved lightguide includes lightguides wherein one or more surfaces has a surface normal wherein the surface normal changes angle as one moves along the surface in a first direction. These can include continuously changing surfaces or curves as well as discretely changing (sharp corners) transitions. The lightguide may be curved on two or more opposite faces or only on one face. The curved shape or surface includes those that can be defined by a mathematical relationships such as $f(x,y,z)$. The cross-sectional side view of an curved surface (or portion of a surface) of a lightguide may illustrate an arc in two-dimensional form that takes the shape of a full or partial circle, parabolic curve, conic section, rational curve, or elliptic curve.

In one embodiment of this invention, a light emitting device comprises a lightguide with a curved region and at least one substantially planar region. In one embodiment of this invention, the lightguide comprises substantially planar lightguide regions disposed in-between a light blocking region. By using planar lightguide regions near the light sources, the construction of the element for the light blocking region, such as a reflector, is less costly since they are simple folds rather than defined curves.

In one embodiment of this invention, the curvature of the lightguide redirects a portion of the output from a first region of the light emitting region by rotating the angle of the exiting light in the direction which the region of the surface from which it exited was rotated relative to a flat, planar surface. For example, when a planar lightguide is curved (or angled) to a concave lightguide relative to the nadir as illustrated in FIG. 1, a portion of the light from the LEDs on the left side of the lightguide which is extracted from the lightguide in the region near the left side of the light extracting region is rotated to larger angles from the nadir than the output from a similar planar lightguide. Similarly, a portion of the light from the LEDs on the right side of the lightguide which is extracted from the lightguide in the region near the right side of the light extracting region is rotated to larger angles from the nadir than the output from a similar planar lightguide.

When a planar lightguide is curved or angled to a convex lightguide relative to the nadir, a portion of the light extracted from the lightguide from the LEDs on the left side of the lightguide in the region near the left side of the light extracting region is rotated to smaller angles from the nadir than the output from a similar planar lightguide. Similarly, a portion of the light extracted from the lightguide from the LEDs on the right side of the lightguide in the region near the right side of the light extracting region is rotated to smaller angles from the nadir than the output from a similar planar lightguide.

Light traveling in a lightguide, from left to right for example, may encounter one or more curved boundary surfaces of the lightguide that increase or decrease the angle of incidence at the lightguide boundary interface relative to a planar lightguide. In one embodiment of this invention, the lightguide is curved or angled in a convex shape relative to the nadir and a portion of the angular light output of the light emitting device relative to that of a similar planar lightguide is directed more toward the nadir in a first plane comprising the curved shape. In a further embodiment of this invention, the lightguide is curved or angled in a concave shape relative to the nadir and a portion of the angular light output of the light emitting device relative to that of a similar planar lightguide is directed more away from the nadir in a first plane comprising the curved shape.

In a further embodiment of this invention, the light blocking region or other element of the light emitting device such as a housing or thermal transfer element or heat sink reflects, absorbs, refracts or scatters a portion of light from a light emitting region of the light emitting device traveling at an angle selected from 40°, 50° 60°, 70° and 80° from the nadir.

In another embodiment of this invention, the light blocking region or other element of the light emitting device such as a housing or thermal transfer element or heat sink reflects, absorbs, refracts or scatters a portion of light from a light emitting region of the light emitting device comprising a curved lightguide such that the luminance in an angular region from 55 degrees to 90 degrees from the nadir is less than the luminance at the same angle from the nadir of a similar light emitting device with a planar, non-curved lightguide.

In one embodiment of this invention, a light emitting device comprises at least one lightguide that has a curved or polygonal cross-sectional shape in a plane parallel to the normal of a region of the light output surface. The lightguide may be tapered in one or more directions. In a further embodiment, the lightguide extends further in a first region in a direction parallel to a surface normal of the light emitting region or nadir than a second region of the lightguide. A lightguide extended further in one region than another may include concave cross-sections, convex cross-sections, arcuate cross-sections or other cross sections that are not symmetric about an axis parallel to the normal to the light emitting output surface or nadir in a region of the light output surface.

Lightguide Orientation

In one embodiment of this invention, a light emitting device comprises at least one lightguide oriented at a first angle alpha from one selected from the group of light emitting region surface normal, nadir, light output surface normal, an outer housing surface of the light emitting device or light fixture, optical axis of the light emitting device, and optical axis of a light source. In one embodiment, alpha is approximately one selected from the group of 0°, 30°, 45°, 60°, and 90°. In a further embodiment of this invention, alpha is one selected from the group of 0°<alpha <30°, 30°<alpha <45°, 45°<alpha <60°, and 60°<alpha <90°. In a further embodiment of this invention, a light emitting device comprises a first lightguide oriented at an angle alpha and a second lightguide oriented at an angle beta. In one embodiment, beta is approximately one selected from the group of 0°, 30°, 45°, 60°, and 90°. In a further embodiment of this invention, beta is one selected from the group of 0°<beta <30°, 30°<beta <45°, 45°<beta <60°, and 60°<beta <90°.

Lightguide Input Edge

In one embodiment of this invention, the surface of the input edge of a lightguide which receives the light from the light source is one of curved, lens-like, convex, concave, non-planar or parametric surface wherein the angular orientation of the surface normal across the surface changes. In one embodiment of this invention, a light emitting device comprises a lightguide with an input surface with a concave region disposed adjacent to a light source. A concave surface disposed to receive light from a light source such that the light from the light source is not refracted toward the optical axis of the light source in the lightguide will spread faster within the lightguide in the plane of the curvature, thus reducing the mixing distance. The curvature may be in the length direction, width direction or both. In one embodiment of this invention, the input edge of a lightguide is concave within a first plane parallel to the optical axis of the light source and convex within a second plane parallel to the optical axis of the light source and perpendicular to the first plane. In one embodiment of this invention, the input surface of the lightguide is illuminated by a plurality of light sources wherein the light from the plurality of light sources cross paths within the lightguide. In a further embodiment of this invention, the lightguide comprises at least one recessed region wherein the light output plane or surface of the light source is at least partially disposed within the recess.

Light Emitting Region

In one embodiment of this invention, a light emitting device comprises a lightguide and a light emitting region. The light emitting region comprises the last optical elements from which the light leaves the light emitting device. In one embodiment of this invention, the light emitting region comprises at least one selected from a light scattering lens, lightguide, light reflecting element, reflector, housing, volumetric light scattering element, diffuser surface relief diffuser, optical film, substrate, substantially transparent lens or protective or holding cover material, and glass lens. The light emitting region may be planar, curved, domed, arcuate, quadric, radially symmetric, more than half of a sphere, or other surface shape. The light emitting region may comprise more than one lightguide in a light emitting device and may include a reflector or transparent, non-scattering lens or region.

Light Output Surface

The light output surface is the outer surface of the light emitting device comprising the light emitting region. In one embodiment, the light output surface is the portion of the outer surface comprising the light emitting region where the light blocking region is not disposed between the light emitting region and the lightguide along a direction normal to the light output surface. In one embodiment of this invention, the light output surface comprises a light extracting region and a non-scattering region which is substantially transparent.

Light Blocking Region

In one embodiment of this invention, a light emitting device comprises at least one light blocking region disposed between the light source and a region of the light output surface. The light blocking region may be a reflector, bezel, or a material with a total luminous transmittance Old of less than 50%. The light blocking region may reflect, scatter, or absorb a first portion of incident light that would not otherwise pass back into the lightguide directly. In one embodiment of this invention, the light blocking region is one selected from the group of aluminum reflector, metallic reflector, metalized film, multilayer polymeric reflective film, light absorbing material, and polymeric material absorbing a first portion of light. The light blocking material may be disposed near or on one or more surfaces of the lightguide. In one embodiment of this invention, the light blocking material comprises a reflector and a light absorbing material disposed near at least one edge of a lightguide wherein the light absorbing material is disposed between the reflector and the bottom surface of the lightguide and the light blocking region does not comprise a light absorbing material disposed on the top surface of the lightguide. In some embodiments, the total width of the light blocking region ranges from about 0.5 inches to about 100 inches in a first directions and ranges from about 0.5 inches to about 100 inches in a second direction normal to the first direction.

In one embodiment of this invention, the light emitting device is a direct-indirect light fixture and the reflector provides the mechanically coupling or physically coupling support for the lightguide and there is no light absorbing region between the top surface of the lightguide and the reflector.

Reflector

In one embodiment of this invention, a light emitting device comprises a light blocking region comprising a reflector disposed to receive direct and indirect light from a light source which does not satisfy the total internal reflection condition. The reflector may be a light reflecting element which reflects or reflects and absorbs substantially all of the incident light from a light source. An example of a reflector used in a light emitting device includes a metal bezel or frame on a lightguide. The light source may be disposed substantially within the reflector and the reflector, light absorbing region or both may extend out over a portion of one or both faces or surfaces of a lightguide. The reflector may be a metal such as aluminum or aluminum composite and may be thermally coupled to the thermal transfer element. In one embodiment of this invention, the reflector is at least one thermal transfer element in the light emitting device system. Reflectors can also be composed of light transmitting materials.

Lightguides often have reflectors near the light sources disposed near the edge of the lightguide to reflect light that is not coupled into the lightguide or does not pass through the lightguide at an angle greater than the critical angle for the lightguide. The light reflected off of the reflectors may be diffusely reflected or specularly reflected. This reflected light may escape the light emitting device after passing through a scattering element or back reflector of the light emitting device.

Stray Light Near Light Blocking Region

In one embodiment of this invention, a light emitting device comprising a lightguide where there is a non-scattering clear region near one or more of the light sources and between the end of the reflector and the light extracting element (such as a volumetric light scattering element), the light reflected off of a surface (top or bottom for example) of the reflector or light blocking region does not further diffuse and passes out through the lightguide. This light is often of a very high luminance due to the proximity to the light source(s). The intensity and orientation of the stray light emitted near a reflector is also affected by the alignment (or centering) of the lightguide edge with the light source or LED. When the light source or LED is not centered on the edge and the thickness of the edge is close to the width of the light emitting region of the light source, a significant portion of light may be directly incident on the reflector before passing through the lightguide. If the distance between the upper and lower faces of the reflector is larger than thickness of the lightguide disposed between the faces, light from a mis-aligned light source or (light source size larger than the edge thickness) can pass between the reflector and lightguide and emit from the device as stray light or cause other unwanted optical effects. In one embodiment of this invention, a light absorbing material is disposed in a region between the reflector and the lightguide and reduces the intensity of stray light and may reduce the apparent luminance of a non-scattering region.

In a further embodiment of this invention, the light blocking region comprises a light absorbing material disposed to receive a first portion of direct light from the light source which is not coupled into the lightguide or a first portion of light from the light source which enters the lightguide and passes out of the lightguide since it does not satisfy the waveguide condition. The light blocking region may be a light absorbing material that absorbs a first portion of stray light on at least one side of the lightguide.

Light Absorbing Material

In one embodiment of this invention, a light absorbing material is disposed in a region between the reflector and the light source such that a portion of the incident light is absorbed. In one embodiment of this invention, the light absorbing material has a d/8 diffuse reflectance less than one selected from 90%, 70%, 50%, 30%, 20%, or 10%. The light absorbing material may absorb one or more visible wavelength regions more than another such that the light which is not absorbed has a color different than the average color of the light from the light sources incident on the light absorbing material. In one embodiment of this invention, the color difference, $\Delta u'v'$, between the average color of the light reaching the light absorbing material and the light exiting the lightguide due to reflection from the reflectors is greater than 0.01.

In one embodiment of this invention, the light absorbing material is tinted, dyed, or colored black or gray and may be transmissive or opaque. The light reflecting from the light absorbing material or the light transmitting through the light absorbing material may be specular or diffuse and the surface of the light absorbing material may have a high gloss or a low gloss. A low gloss material will diffuse more light than a high gloss material. In one embodiment of this invention, the gloss of the light absorbing material measured according to the ASTM D 523 standard is less than one gloss unit selected from 80, 60, 40, 30, 20, 10 and 5. In a further embodiment of this invention, the gloss of the light absorbing material measured according to the ASTM D 523 standard is greater than one gloss unit selected from 80, 60, 40, 30, 20, 10 and 5.

The light absorbing material may be partially light absorbing and may comprise light transmitting materials. The light absorbing material may comprise a polymeric material, an organic material, inorganic material, painted surface, painted metal, or a high temperature material such as chlorinated PVC (CPVC) or a tinted polycarbonate or fluoropolymer.

In one embodiment of this invention, the light absorbing material has a luminous transmittance measured according to ASTM D1003 less than one selected from the group of 10%, 20%, 30%, 50%, 70% and 80%. In a further embodiment of this invention, the light absorbing material has reflectance less than one selected from the group of 10%, 20%, 30%, 50%, 70% and 80%. In a further embodiment of this invention, the light absorbing material has a luminous transmittance less than 5% and a reflectance between 0% and 20%.

Non-Optically Coupled Light Blocking Region

In one embodiment of this invention, the light blocking region comprises a light absorbing region wherein the light absorbing region is not optically coupled to the lightguide. Light absorbing regions which are optically coupled to the lightguide can absorb light traveling within the lightguide in addition to the stray light which does not satisfy the waveguide condition. Light can be prevented from coupling into the light absorbing region by using an air gap or sufficiently low refractive index region between the light absorbing region and the lightguide. An air gap may be achieved in a significant portion of the interface between the light absorbing material and the lightguide by using a light absorbing material with a rough surface or low gloss.

Optically Coupled Light Blocking Region

In one embodiment of this invention, the light blocking region comprises a specularly reflective region which is optically coupled to a region of the lightguide. A specular reflector which is optically coupled to a surface of a lightguide does not significantly affect the direction of light traveling within the lightguide. The specular reflector may be partially absorptive or partially transmissive or a combination of both.

Light Extracting Region Type

In one embodiment of this invention, the light extracting region comprises the light extracting features and is at least one selected from the group of volumetric light scattering region or film, surface relief region or film, a volumetric or surface relief region or film optically coupled in on or more regions to the lightguide or a combination of volumetric and surface relief light scattering region. A light emitting device may comprise more than one or more than one type of light extracting region. Optical films such as volumetric light scattering diffusers or surface relief light scattering diffusers may be optically coupled to the lightguide in predetermined patterns, regions, or uniformly such that a first portion of light is extracted from the lightguide in the optically coupled region.

Light Extracting Region Location

In one embodiment of this invention, the light extracting region is disposed within the lightguide or on at least one surface of the lightguide. In a further embodiment of this invention, the light extracting region is disposed between at least one light source and a light output surface in a first direction parallel to the normal to the light output surface or light emitting region. The light emitting device of one embodiment of this invention comprises more than one light extracting region. On or more of the light extracting regions may be located within or adhered to the lightguide. The light extracting region may be optically coupled to one or more elements of the light emitting device. In one embodiment of this invention, the light extracting region is optically coupled to one or more components of the light emitting device using a low refractive index adhesive. In a further embodiment of this invention, light extracting region, such as a volumetric light scattering region, is located in at least one of within the waveguide, within a substrate, within a multi-region diffuser, between the light redirecting element and the lightguide, within a coating on a lightguide, within a film optically coupled to the lightguide, within an adhesive between two elements or regions of a light emitting device. The light extracting region may be coupled to the top, bottom, or both top and bottom surfaces of the light guide and may be on the opposite or the same side as a light redirecting element.

Light Extraction Features on the Lightguide

In one embodiment of this invention, a light emitting device comprises a lightguide with light extraction surface features disposed on or within at least one inner or outer light output surface. In one embodiment of this invention, the light extraction features are disposed to receive light from within the lightguide and re-direct a first portion of the incident light to an angle less than the critical angle at an outer surface of the lightguide. Light extraction surface features may include non-planar modifications or additions to a surface. An example of adding light extraction surface features include screenprinting translucent or light scattering ink features on the surface of the lightguide such as titanium dioxide or barium sulfate or beads dispersed in a methacrylate based ink or binder. An example of a subtractive modification to a surface to achieve light extraction features includes laser ablation of a PMMA substrate to achieve pits or ridges in a surface to scatter, reflect or refract incident light from within the lightguide. Other light extraction features included injection molded surface features, embossed features into the surface, optically coupling surface-relief films to the lightguide, optically coupling volumetric light scattering regions or films to the lightguide, insert molding optical elements or diffuser films to the lightguide, extruding or casting or injection molding a lightguide comprising light scattering domains within the volume, mechanically or etching or scribing features into the lightguide, abrading features into the lightguide, sandblasting features, printing features, photopolymerizing or selective polymerizing of features into a layer or coating and other methods known in the art of backlights for displays for achieving light extraction from a lightguide. In one embodiment of this invention, a lightguide comprises a light extracting features disclosed in one of U.S. patent application Ser. Nos. 11/244,473, 10/744,276, 10/511,983, 09/833,397, 09/669,932, 11/277,865, and U.S. Pat. Nos. 5,594,830, 5,237,341, 6,447,135, 6,347,873, 6,099,135, and 7,192,174, the contents of which are incorporated by reference herein.

Light Extracting Region Width

In one embodiment of this invention, the total width of the light extracting region in a first direction parallel to the optical axis of at least one light source is less than one selected from 95%, 90%, 80%, 70%, 60%, 50% and 30% of the total width of the lightguide or light output surface in the first direction. The total width of the light extracting region contributes to the uniformity of the light emitted from the light output surface. In a further embodiment of this invention, the total width of the light extracting region in a second direction orthogonal to the optical axis of at least one light source is less than one selected from 95%, 90%, 80%, 70%, 60%, 50% and 30% of the total width of the lightguide or light output surface in the second direction. In one embodiment of this invention, the total width of the light extracting region is between 0.5 inches and 100 inches in a first direction and between 0.5 inches and 100 inches in a second direction orthogonal to the first direction. In some embodiments of this invention, the total width of the light extracting region is between 1 inches and 100 inches in a first direction and between 1 inch and 100 inches in a second direction orthogonal to the first direction.

Light Extracting Region Area

In one embodiment of this invention, the total area of the light extracting regions is less than one selected from 95%, 90%, 80%, 70%, 60%, 50% and 30% of the total area of the lightguide or light output surface. The light emitting device or lightguide may comprise multiple light extracting regions disposed along one or more surfaces or within one or more lightguides within the light emitting device.

Light Extracting Region Shape

In one embodiment of this invention, the cross-sectional shape of one or more of the light extracting regions or light output regions in a plane perpendicular to the normal to the output surface near the light extracting region is one selected from the group of circular, elliptical, square, rectangular, polygonal, amoeba-like, partially curved and straight, a combination of the aforementioned shapes or other closed shape. The shapes may have a genus greater than zero. Shapes with a genus greater than zero include doughnut like areas or stretched doughnut like areas. In a further embodiment of this invention, the cross-sectional shape of one or more of the light extracting regions or light output regions in a plane perpendicular to the normal to the output surface near the light extracting region substantially encloses a non-scattering region.

Light Extraction Region Discontinuity

In one embodiment of this invention, a light emitting device comprises at least one light source, a lightguide, a first light extraction region disposed on the lightguide and a second region of light extraction disposed on the lightguide discontinuous with the first light extraction region.

Non-Scattering Region

In one embodiment of this invention, a light emitting device comprises at least one light source, a lightguide, a light extraction region, a light blocking region, and a substantially non-scattering region disposed in-between the light blocking region and the light extraction region. A non-scattering region or substantially non-scattering region may comprise a region with a low amount or level of scattering. The non-scattering region may be transparent and may absorb a first portion of light such as in the case of a dyed lightguide. In a further embodiment of this invention, the light extracting region is disposed in-between the light blocking region and a non-scattering region. In one embodiment of this invention, the non-scattering region does not substantially scatter light incident externally from one side of the lightguide traveling through the lightguide and out the light output surface. In another embodiment of this invention, the non-scattering region width allows the light from more than one light source to mix within the lightguide such that the light from the light emitting device from the light emitting surface in the region near the non-scattering region has a spatial luminance uniformity greater than one selected from 40%, 50%, 60%, 70%, 80%, and 90%. The degree of scattering, or light redirection from the non-scattering region may be measured by a haze measurement, clarity measurement or angular width of substantially collimated light passing through the region.

Haze is one method for measuring the amount of wide angle scattering in non-scattering region. In one embodiment of this invention, the haze of the substantially non-scattering region measured according to ASTM D1003 with a BYK Gardner Hazemeter is less than one selected from the group of 2%, 5%, 7%, and 10%.

Clarity is one method for measuring the narrow angle scattering of a non-scattering element. In one embodiment of this invention, the clarity of the non-scattering region measured with a BYK Gardner Hazemeter is greater than one of 90%, 93%, 95%, and 98%.

A measurement of the angular FWHM of collimated light passing through a substantially non-scattering region is another method for determining the amount of scatter in a substantially non-scattering region. In one embodiment of this invention, a substantially non-scattering region has an angular FWHM intensity of collimated laser light at 532 nm incident normal to the region less than one of 5°, 3°, 2° and 1° in one or both light output planes.

Non-Scattering Region Width

In one embodiment of this invention, a light emitting device comprises a lightguide with a non-scattering region and a light extracting region wherein the total width of the non-scattering region in a first direction parallel to the optical axis of at least one light source is greater than one selected from 5%, 10%, 20%, 30%, 40%, and 50% of the total width of the lightguide or light output surface in the first direction. In a further embodiment of this invention, the total width of the non-scattering region in a second direction orthogonal to the optical axis of at least one light source is greater than one selected from 5%, 10%, 20%, 30%, 40%, and 50% of the total width of the lightguide or light output surface in the second direction. In one embodiment of this invention, the total width of the non-scattering region is between 1 inch and 100 inches in a first direction and between 1 inch and 100 inches in a second direction orthogonal to the first direction.

The non-scattering region may provide adequate distance in the direction parallel to one light source optical axis for the light flux from more than one light source to mix. In one embodiment of this invention, a light emitting device comprises at least two light sources disposed at one edge of a lightguide separated by a distance D, a light blocking region, and a lightguide comprising a non-scattering region of width W disposed between the light blocking region and the light extracting region. In a further embodiment of this invention, ratio of W/D is greater than one selected from 1, 1.4, 1.8, 2, 4, and 6. In a further embodiment of this invention, a light emitting device comprises an array of LEDs disposed at one edge, a light blocking region, and a transparent non-scattering region disposed between the light blocking region and the light extracting region wherein the pitch of the LEDs is between 0.1 and 13 inches, the width of the transparent non-scattering region is between 1 and 25 inches and the width of the light extracting region is between 3 and 100 inches in a first direction parallel to the optical axis of at least one light source.

Volumetric Light-Scattering Region or Element

In one embodiment of this invention, the light emitting device comprises one or more volumetric light scattering regions, layers or elements comprising dispersed phase domains or voids. Volumetric or surface relief light scattering elements can be composed of light transmitting materials. The matrix or dispersed phase domains may be a gaseous material (hollow lightguide or voided diffuser, respectively, for example) or a light transmitting material. The volumetric or surface relief light scattering regions of one or more embodiments of this invention may scatter light isotropically or anisotropically. In one embodiment of this invention, a lightguide comprises a diffusing film comprising dispersed phase domains within a polymer matrix. Processing and choice of materials can create non-spherical domains which will scatter light anisotropically. Other methods for creating volumetric diffusing elements or diffusers including symmetric and asymmetric shaped domains are described in U.S. Pat. Nos. 5,932,342, 6,346,311, 6,940,643, 6,673,275 6,567,215 and 6,917,396, the contents of which are incorporated by reference herein. Multi-region diffusers may also be used such as those disclosed in U.S. patent application Ser. No. 11/197,246, the contents are incorporated by reference herein.

Haze is one method for measuring the amount of wide angle scattering in an element. In one embodiment of this invention, the haze of the of the surface relief or volumetric light scattering element measured according to ASTM D1003 with a BYK Gardner Hazemeter is greater than one of 5%, 10%, 20%, 50%, 80%, 90%, or 99%.

Clarity is method for measuring the narrow angle scattering of a light scattering element. In one embodiment of this invention, the clarity of the of the surface relief or volumetric light scattering element measured with a BYK Gardner Hazemeter is less than one of 5%, 10%, 20%, 50%, 80%, 90%, or 99%.

The total luminous transmittance in the 0/d geometry of a light scattering element or light transmitting material is one method for measuring the forward scattering efficiency in an element. In one embodiment of this invention, the transmittance of the of the surface relief or volumetric light scattering element measured according to ASTM D1003 with a BYK Gardner Hazemeter is greater than one of 5%, 10%, 20%, 50%, 80%, 90%, or 99%.

In one embodiment of this invention, the total luminous transmittance in the 0ld geometry of the light scattering element is greater than 85%, the haze is greater than 90% and the clarity is less than 15%.

Table 1 describes the angular FHWM diffusion angles in two orthogonal output planes (TD plane and MD plane), the percent luminous transmittance, the percent haze, and the percent clarity for several different volumetric light scattering films used in embodiments of this invention.

TABLE 1

|  | % Transmission | % Haze | % Clarity | TD FWHM (°) | MD FWHM (°) |
| --- | --- | --- | --- | --- | --- |
| ADF1010 | 91 | 75 | 21.6 | 10 | 10 |
| ADF2020 | 93 | 97 | 11.0 | 20 | 20 |
| ADF3535 | 90 | 99 | 3.2 | 30 | 30 |
| ADF5050 | 91 | 100 | 2.8 | 50 | 50 |
| ADF6060 | 89 | 100 | 1.9 | 60 | 60 |

In one embodiment of this invention, a light emitting device comprises a volumetric scattering film optically coupled to the lightguide wherein the amount of diffusion for the volumetric light scattering film was chosen to achieve luminance uniformity along a first direction within the light emitting region of greater than one selected from the group of 50%, 60%, 70%, 80%, and 90%. The degree of diffusion needed to achieve uniformity depends on many factors including the separation between the light source and the volumetric light scattering region, the flux of light incident in a particular region of the volumetric light scattering element (which is related to light output and directionality, and positioning and alignment of the light sources relative to the element), the method used to couple light into the light scattering region, and other optical parameters such as an additional light redirecting element that may be used.

In a further embodiment of this invention, a light emitting device comprises a volumetric scattering film optically coupled to the lightguide wherein the amount of diffusion chosen for the volumetric light scattering film was chosen to achieve a predetermined percentage of direct and indirect light output from one or more light emitting surfaces. In one embodiment of this invention, the percentages of direct and indirect light output from the light emitting device, respectively, is selected from the group of 0% and 100%, 100% and 0%, 0%-10% and 100%-90%, 10%-20% and 90%-80%, 20%-30% and 80%-70%, 30%-40% and 70%-60%, 40%-50% and 60%-50%, 50%-60% and 50%-40%, 60%-70% and 40%-30%, 70%-80% and 30%-20%, 80%-90% and 20%-10%, 90%-100% and 10%-0%.

One or more of the diffusing (scattering) regions may have an asymmetric or symmetric diffusion profile in the forward (transmission) or backward (reflection) directions. In one embodiment of this invention, the light emitting device comprises more than one volumetric light scattering region. The scattering regions or layers may be optically coupled or separated by another material or an air gap. In one embodiment of this invention, the volumetric light scattering regions have a separation distance greater than 5 microns and less than 300 mm. In one embodiment of this invention, a rigid, substantially transparent material separates two diffusing regions. In another embodiment of this invention, the asymmetrically diffusive regions are aligned such that the luminance uniformity of a light emitting device is improved. In another embodiment, the spatial luminance profile of a light emitting device using a linear or grid array of light sources is made substantially uniform through the use of one or more asymmetrically diffusing regions.

The use of a volumetric anisotropic light scattering element or region in the light emitting device allows the scattering region to be optically coupled to the light guide such that it will still support waveguide conditions for a first portion of light. An anisotropic surface relief scattering region on the surface of the light guide or a surface of a component optically coupled to the light guide will substantially scatter light in that region out of the light guide and will typically not permit spatially uniform out-coupling in the case of surface relief scattering over a significant portion of the light guide output surface.

In one embodiment of this invention, a light emitting device comprises a lightguide with a volumetric anisotropic light scattering region wherein asymmetrically shaped dispersed phase domains of one polymer within another matrix polymer contribute to the anisotropic light scattering. The anisotropic scattering region may be non-polarization dependent anisotropic light scattering (NPDALS) or polarization dependent anisotropic light scattering (PDALS). Light fixtures with polarized light output can reduce the glare off of surfaces and are discussed in U.S. Pat. No. 6,297,906, the contents of which are incorporated herein by reference.

The amount of diffusion in the x-z and y-z planes for the NPDALS or PDALS regions affects the luminance uniformity and the angular light output profiles of the light emitting device. By increasing the amount of diffusion in one plane preferentially over that in the other plane, the angular light output from the light emitting device is asymmetrically increased. For example, with more diffusion in the x-z plane than the y-z plane, the angular light output (measured in the FWHM of the intensity profile) is increased in the x-z plane. The diffusion asymmetry introduced through one or more of the anisotropic light-scattering regions or the light filtering directional control element can allow for greater control over the viewing angle, color shift, color uniformity, luminance uniformity, and angular intensity profile of the light emitting device and the optical efficiency of the light emitting device. In another embodiment, the amount of diffusion (measured as FWHM of the angular intensity profile) varies in the plane of the diffusing layer. In another embodiment, the amount of diffusion varies in the plane perpendicular to the plane of the layer (z direction). In another embodiment of this invention, the amount of diffusion is higher in the regions in close proximity of one or more of the light sources.

The birefringence of one or more of the substrates, elements or dispersed phase domains may be greater than 0.1 such that a significant amount of polarization selectivity occurs due to the difference in the critical angle for different polarization states when this optically anisotropic material is optically coupled to or forms part of the light guide. An example of this polarization selectivity is found in U.S. Pat. No. 6,795,244, the contents of which are incorporated herein by reference.

Alignment of Major Diffusing Axis in Anisotropic Light Scattering Region

The alignment of the major axis of diffusion in one or more of the anisotropic light-scattering regions may be aligned parallel, perpendicular or at an angle $\theta_3$ with respect to the optical axis of a light source or edge of the waveguide. In one embodiment, the axis of stronger diffusion is aligned perpendicular to the length of a linear light source in a cold-cathode fluorescent edge-lit light emitting device. In another embodiment of this invention, the axis of stronger diffusion is aligned perpendicular to the length of a linear array of LEDs illuminating the edge of lightguide in an edge-lit light emitting device.

Domain Shape

The domains within one or more light scattering regions may be fibrous, spheroidal, cylindrical, spherical, other non-symmetric shape, or a combination of one or more of these shapes. The shape of the domains may be engineered such that substantially more diffusion occurs in the x-z plane than that in the y-z plane. The shape of the domains or domains may vary spatially along one or more of the x, y, or z directions. The variation may be regular, semi-random, or random.

Domain Alignment

The domains within a diffusing layer may be aligned at an angle normal, parallel, or an angle theta with respect to an edge of the diffusing layer or a linear light source or array of light sources, light source optical axis, light emitting device optical axis, or an edge of the lightguide or light redirecting optical element. In one embodiment, the domains in a diffusing region are substantially aligned along one axis that is parallel to a linear array of light sources. In another embodiment of this invention, the alignment of the dispersed phase domains rotates from a first direction to a second direction within the region. In one embodiment of this invention, the light emitting device comprises a volumetric light scattering region wherein the domains are aligned substantially parallel to one or more of the x direction, y direction, z direction, or an angle relative to the x, y, or z direction.

Domain Location

The domains may be contained within the volume of a continuous-phase material or they may be protruding (or directly beneath a partially conformable protrusion) from the surface of the continuous-phase material.

Domain Concentration

The domains described herein in one or more light-diffusing regions may be in a low or high concentration. When the diffusion layer is thick, a lower concentration of domains is needed for an equivalent amount of diffusion. When the light-diffusing layer is thin, a higher concentration of domains or a greater difference in refractive index is needed for a high amount of scattering. The concentration of the dispersed domains may be from less than 1% by weight to over 50% by weight. In certain conditions, a concentration of domains higher than 50% by volume may be achieved by careful selection of materials and manufacturing techniques. A higher concentration permits a thinner diffusive layer and as a result, a thinner light emitting device or light filtering directional control element. The concentration may also vary spatially along one or more of the x, y, or z directions. The variation may be regular, semi-random, or random.

Index of Refraction

The difference in refractive index between the domains and the matrix in one or more of the NPDALS, PDALS or other light scattering regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions. In one embodiment of this invention, the refractive index of the domains is $n_{px}$, $n_{py}$, $n_{pz}$ and in the x, y, and z directions, respectively and the refractive index of the matrix or continuous phase region is $n_{mx}$, $n_{my}$, $n_{mz}$ in the x, y, and z directions, respectively, wherein at least one of $|n_{px}-n_{mx}|>0.001$, $|n_{py}-n_{my}|>0.001$, or $|n_{pz}-n_{mz}|>0.001$.

The refractive index of the individual polymeric domains is one factor that contributes to the degree of light scattering by the film. Combinations of low- and high-refractive-index materials result in larger diffusion angles. In cases where birefringent materials are used, the refractive indexes in the x, y, and z directions can each affect the amount of diffusion or reflection in the processed material. In some applications, one may use specific polymers for specific qualities such as thermal, mechanical, or low-cost; however, the refractive index difference between the materials (in the x, y, or z directions, or some combination thereof) may not be suitable to generate the desired amount of diffusion or other optical characteristic such as reflection. In these cases, it is known in the field to use small domains, typically less than 100 nm in size to increase or decrease the average bulk refractive index. Preferably, light does not directly scatter from these added domains, and the addition of these domains does not substantially increase the absorption or backscatter.

During production of the light filtering directional control element or one of its regions, the refractive index of the domains or the matrix or both may change along one or more axes due to crystallization, stress- or strain-induced birefringence or other molecular or polymer-chain alignment technique.

Additive materials can increase or decrease the average refractive index based on the amount of the materials and the refractive index of the polymer to which they are added, and the effective refractive index of the material. Such additives can include: aerogels, sol-gel materials, silica, kaolin, alumina, fine domains of MgF2 (its index of refraction is 1.38), $SiO_2$ (its index of refraction is 1.46), AlF3 (its index of refraction is 1.33-1.39), CaF2 (its index of refraction is 1.44), LiF (its index of refraction is 1.36-1.37), NaF (its index of refraction is 1.32-1.34) and ThF4 (its index of refraction is 1.45-1.5) or the like can be considered, as discussed in U.S. Pat. No. 6,773,801, the contents of which are incorporated herein by reference. Alternatively, fine domains having a high index of refraction, may be used such as fine particles of titania (TiO2) or zirconia (ZrO2) or other metal oxides.

Other modifications and methods of manufacturing anisotropic light scattering regions, and light emitting devices and configurations incorporating anisotropic light scattering elements are disclosed in U.S. Pat. No. 7,278,775, the contents of which are incorporated by reference herein. The modifications and configurations disclosed therein may be employed in an embodiment of this invention.

Scattering Element Location

The light emitting device of one embodiment of this invention comprises one or more light scattering elements. On or more of the elements may be located within or adhered to the lightguide. The light scattering region may be optically coupled to one or more elements of the light emitting device. In one embodiment of this invention, the light scattering element is optically coupled to one or more components of the light emitting device using a low refractive index adhesive. In a further embodiment of this invention, the light scattering element, such as a volumetric light scattering region, is located in at least one of within the waveguide, within a substrate, within a multi-region diffuser, between the light redirecting element and the lightguide, within a coating on a lightguide, within a film optically coupled to the lightguide, within an adhesive between two elements or regions of a light emitting device. The light scattering element may be coupled to the top or bottom of the light guide and may be on the opposite or the same side as a light redirecting element.

In one embodiment of this invention, the light scattering element is patterned or graded in diffusion. Examples of patterned or graded diffusers and their patterns are disclosed in U.S. patent application Ser. Nos. 11/949,222, 10/984,407, 10/984,390 and U.S. Pat. No. 6,867,927, the contents of which are incorporated by reference herein.

Light Transmitting Material Composition

In an embodiment of this invention, at least one of the lightguide, optical film or element, light extracting region, volumetric light scattering region, light scattering element, non-scattering region, light redirecting optical element, housing, mounting element, comprises a light transmitting material.

In one embodiment of this invention, the light transmitting material is a polymer or a polymer blend or alloy material comprising multiple polymers, glass, rubbers, or other materials. Each material may be a single phase or multiple phase material.

Such polymers include, but are not limited to acrylics, styrenics, olefins, polycarbonates, polyesters, cellulosics, and the like. Specific examples include poly(methyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly (ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly (propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly (phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include poly-styrene, poly(p-methyl styrene), poly(m-methyl styrene), poly(p-tertiary butyl styrene), poly(p-chlorostyrene), poly (m-chloro styrene), poly(p-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly (ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for phases of the present invention. Polycarbonate resins are typically obtained by reacting a diphenol with a carbonate precursor by solution polymerization or melt polymerization. The diphenol is preferably 2,2-bis(4-hydroxyphenyl)propane (so-called "bisphenol A"), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfide and bis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention.

Light Transmitting Material Additives

Additives, components, blends, coatings, treatments, layers or regions may be combined on or within the aforementioned regions to provide additional properties to the light transmitting material. These may be inorganic or organic materials. They may be chosen to provide increased rigidity to enable support of additional films or light emitting device components. They may be chosen to provide increased thermal resistance so that the plate or film does not warp. They may be chosen to increase moisture resistance, such that the plate does not warp or degrade other properties when exposed to high levels of humidity. These materials may be designed to provide improved optical performance by reducing wet-out when in contact with other components in the light emitting device. Additives may be used to absorb ultra-violet radiation to increase light resistance of the product. They may be chosen to increase, decrease, or match the scratch resistance of other components in the light fixture, display, backlight, or other light emitting device. They may be chosen to decrease the surface or volumetric resistance of the element such as a lightguide or a region of the element to achieve anti-static properties.

The additives may be components of one or more layers of the optical element or lightguide. The additives may be coatings that are added onto a surface or functional layers that are a combined during the manufacturing process. The additives may be dispersed throughout the volume of a layer or coating or they could be applied to a surface.

Adhesives such as pressure-sensitive or UV-cured adhesives may also be used between one or more layers to achieve optical coupling. Materials known to those in the field of optical films, plates, diffuser plates, films and backlights to provide optical, thermal, mechanical, environmental, electrical and other benefits may be used in the volume or on a surface, coating, or layer of the optical element or one of its regions. The adhesive layer may also contain symmetric, asymmetric, or a combination of symmetric and asymmetric domains in order to achieve desired light-scattering properties within the diffusion layer.

Light Transmitting Material Anti-Static Additives

Anti-static monomers or inert additives may be added to one or more regions or domains of the light transmitting material. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

Light Redirecting Elements (LRE)

Light redirecting optical elements are optical elements that direct a first portion of incident light from a first angular direction into a second angular direction different from the first. Light redirecting elements can be composed of light transmitting materials. Light redirecting elements include diffusive or scattering elements, refracting elements, reflecting elements, re-emitting elements, diffractive elements, holographic elements, or a combination of two or more of the aforementioned elements. The elements may be grouped into regions spatially or the features may be hybrid components such as a refractive-TIR fresnel lens hybrid structure. Other light redirecting elements include collimating films such as BEF film from 3M Company and beaded bottom diffusers such as BS-700 light diffusing film from Keiwa and embossed light diffusing film UTE-22 from Wellstech Optical Company Ltd, off-axis directing films such as IDF film from 3M company, lenticular lens arrays, microlens arrays, volumetric diffusers, surface relief diffusers, voided diffusers, voided reflective films or materials, multi-layer reflective films such as ESR from 3M, polarization reflective films such as DBEF from 3M, reflective polarizers, scattering polarizers, lightguides, diffractive or holographic surface relief diffusers or elements, holographic volumetric diffusers or elements, microlenses, lenses, other optical elements known in the optical industry to redirect light, or a combination of two or more of the aforementioned elements or regions of elements.

LRE Air-Gap

In one embodiment of this invention, the LRE is separated from the lightguide by an air-gap or low refractive index region. By separating the LRE from the lightguide by an air-gap region, the LRE does not cause additional light extraction from the lightguide at the interface of the air-gap region.

In another embodiment of this invention, the light redirecting element is separated from another optical element or lightguide within the device by standoff regions. In one embodiment, the longest dimension of the standoffs in a plane perpendicular to the light emitting device optical axis is less than one selected from 3 mm, 1 mm, 0.5 mm, 0.2 mm and 0.1 mm. In one embodiment of this invention, the standoffs are small beads or particles disposed in region between the LRE and the lightguide. By using beads or particles that are sufficiently small, mechanically coupling between the LRE and lightguide can occur without visible sight of the light extracting from the beaded region. In one embodiment of this invention, the beads or domains have an average dimensional size less than one selected from the group of 200 µm, 100 µm, 75 µm, 25 µm and 10 µm. In a further embodiment of this invention, the small beads or particles are dispersed between the lightguide and LRE such that the light extracted from the lightguide due to the coupling from the beads creates a defined or random pattern of higher luminance regions at angles further from the light output surface normal.

LRE Support

The light redirecting optical element may be physically coupled to a support substrate to position or hold it in a predetermined location within the light emitting device. In one embodiment of this invention, the support substrate comprises substantially transparent, non-scattering or refracting regions. The substrate may be held, clamped, adhered or otherwise physically coupled to a second element, such as the housing or metal frame of a light emitting device which is further physically coupled to the lightguide. In one embodiment of this invention, the light redirecting element may be a microlens array or lenticular lens array pattern disposed on a region on the surface of a clear non-scattering light transmitting film such as an acrylic based film. The film may be supported at one or more edges such that a first transparent region of the lightguide is not visibly obscured by a physical coupler or light blocking region which holds the light transmitting film supporting the LRE.

LRE Physically Coupled to the Lightguide Support

In a further embodiment of this invention, the light redirecting element is physically coupled to the lightguide in a first region of the lightguide and LRE. In one embodiment, the LRE is coupled near the peripheral edges of the LRE to the lightguide using an automatic liquid dispenser such as those sold by I&J Fisnar Inc and a UV curable adhesive. In a further embodiment of this invention, the LRE is optically coupled to the lightguide in a first region. Where the LRE is optically coupled to the lightguide, the light is strongly coupled out of the lightguide. This can be used, for example, to create a pattern or desired appearance for the light emitting surface.

The LRE may also be mechanically or physically coupled to the lightguide through a framed border or patterned region. The frame may be transparent, translucent, opaque or partially light transmitting. The frame may have a higher transmission for different wavelengths of light such that the frame is colored. In one embodiment, the frame comprises reflective, white, mechanically coupling regions which reflect light back into the lightguide in the regions where the frame is physically coupled to the lightguide. In one embodiment of this invention, the coupling region is at least one selected from the group of light reflective, opaque, colored, or diffuse. By using a reflective coupling region, a first portion of the light from the lightguide may be reflected back into the lightguide. By using an opaque coupling region, the light that would be strongly coupled out of the lightguide at the region is blocked from being visible as a high luminance region. By using a colored coupling region, the light extracted from the lightguide in the coupling region will be visible as a reduced luminance colored or tinted region. If the coupling region is diffuse, the light extracted from the lightguide may be visible as a reduced luminance non-colored region. In a further embodiment, the coupling region may be a combination of more than one of the aforementioned coupling regions. In one embodiment of this invention, the frame is disposed to reflect, scatter, or absorb light received from a first region comprising at least one edge of the LRE such that the light emitted from the first region is not directly emitted from the light emitting device.

The physical coupling can be achieved through patterned adhesive deposition (such as ink jet type deposition systems, screenprinting systems and other systems suitable for depositing adhesives in a pattern) onto the lightguide and or the light redirecting element and laminating them or pressing them together and curing if necessary. Other methods for coupling include injection molding, gluing, laser welding in specific regions, ultrasonic welding in specific regions, localized thermal bonding and other techniques known in the glass and plastic bonding field to bond materials to light transmitting materials.

LRE—Edge Obscuration Region

In a further embodiment of this invention, the light emitting device comprises a light obscuring region disposed to scatter backwards (reflectively scatter), scatter forward (transmissively scatter), absorb, refract or otherwise redirect a first portion of light from a first region comprising at least one edge of the LRE. In one embodiment of this invention, the light obscuring region is a light scattering material deposited on the light redirecting element or supporting sheet or other element. The light scattering material may include reflective inks, light scattering inks, light reflecting paint, volumetric or surface relief scattering element or film or other scattering material. The light scattering material may be deposited by common methods known in the lighting or backlight printing industries such as screenprinting, ink jet deposition, lamination, or other adhesion techniques. In another embodiment of this invention, a frame around a first portion of the light redirecting element physically couples the lightguide to the light redirecting element and obscures a portion of the edge of the light redirecting element.

LRE—Lenticular Lens

In one embodiment of this invention, the light redirecting element is a lenticular lens array surface relief structure comprising a substantially linear array of convex refractive elements which redirect light from a first angular range into a second angular range. In another embodiment of this invention, the light redirecting element is a lenticular lens array film. As used herein, a lenticular elements or structures include, but are not limited to elements with cross-sectional surface relief profiles where the cross-section structure is hemispherical, aspherical, conical, triangular, rectangular, polygonal, or in the form of an arc or other parametrically defined curve or polygon or combination thereof. Lenticular structures may be linear arrays, two-dimensional arrays such as a microlens array, close-packed hexagonal or other two-dimensional arrays. The features may employ refraction along with total internal reflection such that the output angular range is less than the input angular range within one or more light output planes. Lenticular structures may also be used to redirect light to an angle substantially off-axis from the optical axis of the element. As used herein, lenticular may refer to any shape of element which refracts or reflects light through total internal reflection and includes elements referred to as "non-lenticular" in U.S. Pat. No. 6,317,263, the contents of which are incorporated by reference herein. The lenticular structure may be disposed on a supporting substrate. In one embodiment, the focal point of the structures is substantially near the opposite surface of the supporting substrate. The material, methods of making and structures of lenticular lens arrays, microlens arrays, prismatic films, etc. are known in the art of light fixtures, backlights, projection screens and lenticular and 3D imaging.

In another embodiment of this invention, the LRE comprises a layer of beads. Analogous to the lenticular lens array, an array comprising a randomized assortment of beads may be used to collimate or substantially reduce the angular extent of light exiting from a light transmitting lightguide. The primary differences include the fact that the bead type light redirecting element will reduce the angular extent of the output light in all planes of the output light normal to the exiting surface. However, the ability to achieve very high levels of collimation is limited and the fill-factor, and ultimate collimation ability is limited due to the cross-sectional area limitations of close-packing an array of spheres (or hemispheres or spheroidal lens-like structures).

Common materials such as those used to manufacture lenticular screens such as vinyl, APET, PETG, or other materials described in patents referenced elsewhere herein may be used in the present invention for a light transmitting material or light redirecting element. Light redirecting elements may comprise light transmitting materials. In a further embodiment, a material capable of surviving temperature exposures higher than 85 degrees Celsius may used as the lenticular lens or substrate to the lenticular lens or bead based element such as biaxially oriented PET or polycarbonate. By using a material capable of withstanding high temperature exposure, manufacturing processes such as heating during a pressure application stage or heating during an exposure stage may be used to decrease the production time.

In one embodiment of this invention a light emitting device comprises a lenticular light redirecting element that collimates light such as a 90 degree apex angle prismatic film. In one embodiment of this invention, a light emitting device comprises a light redirecting element that is a collimating film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd., ESTINAWAVE W518 and W425 DI sold by Sekisui Chemical Co., Ltd, and RCF90 collimating film sold by Reflexite Inc.

LRE—Pitch

The pitch of the light redirecting element or lenticular lens structure may have an effect on the focusing power, the thickness of the lenticular lens array and substrate and other optical properties such as moiré. The pitch of the LRE may be designed such that luminance variances due to the structures of the LRE are discernable, barely discernable or not discernable to a viewer at a defined distance with average visual acuity. In one embodiment of this invention, the pitch of the LRE is less than one selected from the group of 300 µm, 200 µm, 100 µm or 50 µm. In another embodiment of this invention, the pitch of the LRE is greater than or equal to one selected from the group of 100 µm, 150 µm, 200 µm, 300 µm, 400 µm, 600 µm and 800 µm.

The pitch may also be specified by Lenses Per Inch, or LPI, as is commonly used in the graphic arts industry for elements such as lenticular lens film. One can convert from lenses per inch to pitch in µm by dividing 25400 by the number of lenses per inch. In one embodiment of this invention, the pitch of the LRE is less than one selected from the group of 85 LPI, 127 LPI, 254 LPI or 508 LPI. In another embodiment of this invention, the pitch of the LRE is greater than one selected from the group of 127 LPI, 85 LPI, 43 LPI, and 32 LPI.

LRE—Lens Curvature

The curvature of the light redirecting element or lenticular lens structure will have an effect on the angular optical properties of the light exiting the LRE and light emitting device. For spherical curvatures, the radius of curvature may be used to define the degree of curvature. In one embodiment of this invention, a light emitting device comprises a LRE with a cross-sectional surface curve substantially representing a portion of a circle with a radius of curvature less than or equal to one selected from the group of 500 µm, 350 µm, 250 µm, 150 µm, and 100 µm. In a further embodiment of this invention, a light emitting device comprises a LRE with an aspherical surface structure with a cross-sectional surface curve substantially representing a portion of an ellipse. In one embodiment of this invention, the cross-sectional curve of a surface of the lens comprises a portion of an ellipse in the form $$AX^2 + BXY + CY^2 + DX + EY + F = 0.$$

Other shapes and variations on ellipses may be used such as disclosed in U.S. Pat. No. 6,795,250, the contents of which are incorporated herein by reference.

The radius of curvature and other optical properties of several linear lenticular lens films is shown in Table 2 where the lpi of the lenses are the manufacturers product codes and the other data is measured.

TABLE 2

|  | Units | 138 lpi | 75 lpi | 60 lpi |
| --- | --- | --- | --- | --- |
| Radius of Curvature | µm | 115 | 210 | 310 |
| Pitch | µm | 200 | 335 | 421 |
| Lens height (sag) | µm | 59 | 80 | 83 |
| Total thickness | µm | 248 | 538 | 751 |
| Lens to Flat Surface |  |  |  |  |
| Transmission | % | 92.9 | 89.4 | 90.4 |
| Haze | % | 90.9 | 89.6 | 87.3 |
| Clarity | % | 39.5 | 40.2 | 40.7 |
| Flat to Lens Surface |  |  |  |  |
| Transmission | % | 70.9 | 75 | 87.7 |

TABLE 2-continued

|  | Units | 138 lpi | 75 lpi | 60 lpi |
| --- | --- | --- | --- | --- |
| Haze | % | 87.2 | 86.9 | 85.5 |
| Clarity | % | 39.4 | 39.6 | 41.6 |

LRE—Lens Sagittal Depth

In one embodiment of this invention, the light redirecting element comprises a surface relief structure of volumetric light scattering element with a sagittal depth, or sag, greater than 5 µm. In some embodiments, the light redirecting element comprises a surface relief structure or volumetric light scattering element with a sag of at least 10 µm, 15 µm, 20 µm or 25 µm. The sag depth of a lens element, such as a lenticule in a lenticular lens array film, is the distance from a flat plane at a given diameter of the lens to the furtherest point on a concave surface of the lens. As used herein, the diameters of the lens elements of the light redirecting element refer to the width of the light refracting lens at the base plane of the lens.

Figure 7:
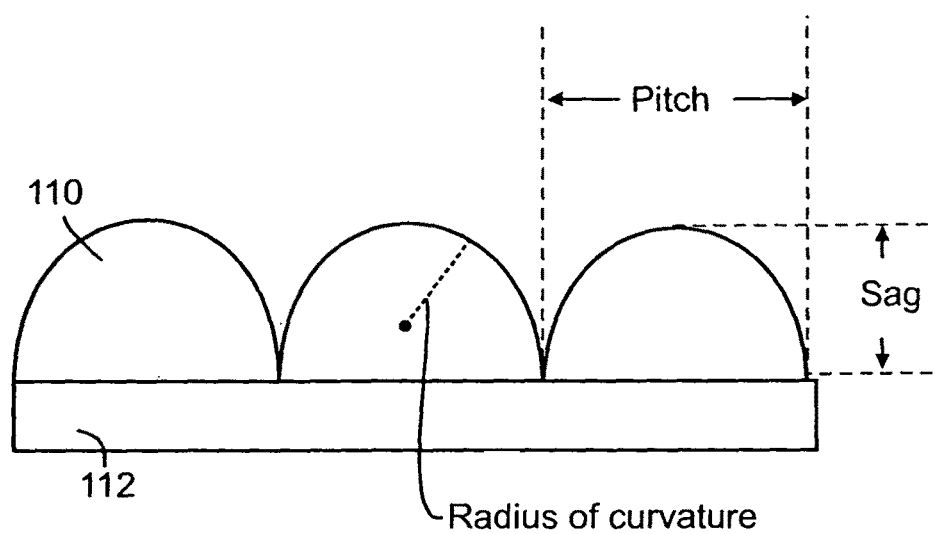
FIG. 7 is a cross-sectional side view of the light redirecting element of FIG. 1.

FIG. 7 is a cross-sectional side view of the light redirecting element of FIG. 1 showing the radius of curvature, sag, and pitch.

LRE—Optical Properties

The light redirecting optical element may redirect light through optical properties in a region of the volume of the element, through a first surface, through a second surface or through a combination of volume and surfaces. When the element has different optical properties on two opposing surfaces, the optical properties may vary when measured with light incident on the first surface compared to light incident on the second surface. This can be seen in the data shown in Table 2 where the optical properties of haze, transmission, and clarity for different linear lenticular lens array films vary depending on whether the light is incident on lens side first (Lens to Flat) or the flat side first (Flat to Lens). The difference can be seen more particularly with partially collimated incident light as is the case with the BYK Gardner hazemeter complying with ASTM D1003 specifications. The data in Table 2 illustrates the reduction in transmission of the light when the light enters the flat surface first due to a significant portion of the incident light totally internally reflecting from the lens surface and returning toward the source, thus reducing transmission and increasing reflection.

Haze is one method for measuring the amount of wide angle redirection of light in an light redirecting element. In one embodiment of this invention, the haze of the of the light redirecting element measured in a first direction according to ASTM D1003 with a BYK Gardner Hazemeter is greater than one of 5%, 10%, 20%, 50%, 80%, 90%, or 99%. In a further embodiment of this invention, a light emitting device comprises a light redirecting element with a haze between 80% and 95% when measured in a first direction.

Clarity is one method for measuring the amount of narrow angle redirection of light in a light redirecting element. In one embodiment of this invention, the clarity of the of the light redirecting element measured in a first direction with a BYK Gardner Hazemeter is less than one of 5%, 10%, 20%, 50%, 80%, 90%, or 99%. In a further embodiment of this invention, a light emitting device comprises a light redirecting element with a clarity between 30% and 50% when measured in a first direction.

The total luminous transmittance in the 0/d geometry of a light scattering element or light transmitting material is one method for measuring the forward scattering efficiency in an element. In one embodiment of this invention, the transmittance of the light redirecting element measured according to ASTM D1003 with a BYK Gardner Hazemeter is at least one of 5%, 10%, 20%, 50%, 80%, 90%, or 99%. In a further embodiment of this invention, a light emitting device comprises a light redirecting element with a total luminous transmittance in the 0/d geometry greater than 85% when measured in a first direction. In another embodiment of this invention, a light emitting device comprises a light redirecting element with a total luminous transmittance in the 0/d geometry greater than 85% when measured in a first direction and less than 90% when measured in a second direction opposite the first direction. In another embodiment of this invention, a light emitting device comprises a light redirecting element with a total luminous transmittance in the 0/d geometry greater than 85% when measured in a first direction and less than 85% when measured in a second direction opposite the first direction.

LRE—Collimation Properties

One or more surfaces or region of a surface of the light transmitting material, lightguide light redirecting element, light scattering element, or surface relief scattering element may include surface profiles that provide collimation properties. The collimation properties may direct light rays incident from large angles into angles closer to the normal (smaller angles) of at least one region of the light output surface of the light emitting device. The features may be in the form of a linear array of prisms, an array of pyramids, an array of cones, an array of hemispheres or other feature that is known to direct more light into the direction normal to the surface of the backlight. The array of features may be regular, irregular, random, ordered, semi-random or other arrangement where light can be collimated through refraction, reflection, total internal reflection, diffraction, or scattering. The degree of collimation of light output can be measured by looking at the luminous intensity of the light at a first angle from the normal compared with a second angle from the normal smaller than the first. Luminous intensity ratios comparing the luminous intensity at a high angle to the luminous intensity at a lower angle is one method for evaluating the collimation of light output or reduction of light in higher angles. Angles of evaluation may include the angles 0°, 30°, 40°, 50°, angles of peak luminous intensity, and other angles of interest such as 55°, 65°, 75°, and 85° as detailed in American National Standard Practice for Office Lighting, ANSI/IESNA RP-1-04 in section 9.6.2 and other sections, the contents of which are incorporated by reference herein. The luminous intensity output ratios for two different angular combinations for a light emitting device comprising a linear lenticular lens array light redirecting element are shown in Table 3.

LRE—Luminous Intensity

In one embodiment of this invention, a light emitting device comprises a lightguide and a light redirecting element that collimates the light received from the lightguide in a first plane such that one or more angles of peak luminous intensity from the normal to the light output surface or nadir are less than the light emitting device without the light redirecting element. In one embodiment of this invention, the ratio of the luminous intensity at 40° from the normal to the light output surface or nadir to the luminous intensity normal to the light emitting surface or at the nadir is greater than or equal to one selected from 1.2, 1.36, 1.5, 2, 2.5, 3, 4, and 5.

TABLE 3

|  | 138 lpi | 75 lpi | 60 lpi |
|---|---|---|---|
| lv(peak)/lv(0°) | 1.5 | 1.36 | 2 |
| lv(40°)/lv(0°) | 1.5 | 1.36 | 2 |

When used in certain environments, it is desirable for light fixtures to have certain luminous intensities at particular angles. For example, in office lighting, it is recommended to have luminous intensities below 300 candelas for angles greater than 55° from the nadir to reduce glare in environments where a majority of the occupant's time is spent viewing visual display terminals according to American National Standard Practice for Office Lighting, ANSI/IESNA RP-1-04 in section 9.6.2, the contents of which are incorporated by reference herein. In a further embodiment of this invention, a light emitting device comprises at least one light source, a lightguide, a light extracting region, a light redirecting element, a light blocking region, and a non-scattering region disposed on the lightguide between the light blocking region and the light emitting region such that the direct luminous intensity from the light emitting device at angles from the vertical, nadir, or normal to the light output surface in a first region, is less than or equal to at least one of 300 candelas at 55°, 220 candelas at 65°, 135 candelas at 75°, and 45 candelas at 85°. In a further embodiment of this invention, the direct luminous intensity from the light emitting device at angles from the vertical, nadir, or normal to the light emitting output surface in a first region, is less than or equal to at least one of 300 candelas at 65°, 185 candelas at 75°, and 60 candelas at 85°.

Direct/Indirect Light Output

In one embodiment of this invention, the light emitting device is one of a direct light fixture, indirect light fixture, and a direct/indirect light fixture. The light extracted from a lightguide may exit the lightguide from one or more surfaces. Light extracted from a lightguide in directions on opposite sides of a lightguide may be directed away from the lightguide such that the light emitting device has a direct and indirect light output profile. The amount of light directed in the up (indirect) or down (direct) directions from a light emitting device such as a light fixture can be categorized by the percentage of light flux directed up and directed down. In one embodiment of this invention, a light emitting device comprising a curved lightguide, non-scattering region, light extracting region, and light redirecting element has a an approximate luminous flux output selected from at least about 90% up and up to about 10% down, from at least about 70% up and up to about 30% down, from at least about 50% up and up to about 50% down, up to about 30% up and at least about 70% down. In another embodiment of this invention, the luminous flux output of a light emitting device is one selected from 100%-90% up and 0%-10% down, 90%-70% up and 10%-30% down, 70%-50% up and 30%-50% down, 50%-30% up and 50%-70% down, 30%-0% up and 70%-100% down. In a further embodiment of this invention, a light emitting device has a first luminous flux output in the up direction between 0% and 100% and a second luminous flux output in the down direction of 100% minus the first luminous flux output in the up direction.

In a further embodiment of this invention, a light emitting device comprises a curved lightguide, non-scattering region, and light emitting region wherein the device is a direct/indirect light fixture wherein the percentages of the total luminous output flux comprised in the zone from 0° to 30° is 0% to 15%, 0° to 40° is 10% to 25%, 0° to 60° is 15% to 35%, 60° to 90° is 0% to 15%, 0° to 90° is 25% to 50%, and 90° to 180° is 40% to 80%.

FIG. 8 shows the luminous intensity output of a direct/indirect light fixture of one embodiment of this invention comprising two linear arrays of LEDs illuminating a lightguide through opposing edges, a light blocking region disposed near the LEDs, a light output surface comprising a non-scattering region disposed between a light blocking region and the light emitting region, and a volumetric light scattering diffuser film with an angular FWHM intensity diffusion profile of 50°×50° optically coupled to the lightguide and a lenticular lens array light redirecting film oriented with the array of lenticules parallel to the array of LEDs wherein the lightguide is straight (non-curved) near the LEDs and curved in-between the straight sections.

Factors which can affect the relative flux output upwards or downwards include but are not limited to lightguide shape, light extracting region properties and orientation, location of the light extracting region (for example top or bottom of the lightguide), lightguide shape, light source output profile, light source location and orientation, light redirecting element properties, location and orientation, and light blocking element properties, location and orientation.

In one embodiment of this invention, a light emitting device is a direct or indirect light fixture comprising a lightguide and a light reflecting region disposed to receive a first portion of light from one surface of a lightguide and re-direct a second portion of the first portion of light back towards the lightguide.

Light Reflecting Element and Region

In one embodiment of this invention, a light emitting device comprises a light reflecting element disposed to receive light from one side of the lightguide and redirect a first portion of the light received back toward the lightguide. Direct-only or indirect-only light fixtures may comprise a light reflecting element in order to direct light that is extracted one side of the lightguide back through the lightguide. In one embodiment of this invention, a light reflecting element comprises a light reflecting region. The light reflecting region may be specularly reflecting, diffusely reflecting or some combination in-between. The light reflecting region may comprise a reflective ink, beads or other additives that substantially reflect light of one or more wavelength ranges. The reflective additive used in an ink or polymer system may include BaSO4, TiO2, organic clays, fluoropolymers, glass beads, silicone beads, cross-linked acrylic or polystyrene beads, alumina, or other materials known in the diffusion screen or film industry for backlights or projection screens such that the refractive index difference between them and a supporting polymer matrix or binder is sufficiently high to reflect light or scatter light backwards. The light reflecting region may also be a light reflecting material such as PTFE, or it may comprise a blend of thermoplastic polymers such as described in U.S. patent application Ser. No. 11/426,198, or U.S. Pat. Nos. 5,932,342, 5,825,543, and 5,268,225, the text of which are incorporated by reference herein where the refractive index between the two polymers is chosen to be very high such that the light reflects from the film. In another embodiment of this invention, the light reflecting region is a voided film such those described in U.S. Pat. Nos. 7,273,640, 5,843,578, 5,275,854, 5,672,409, 6,228,313, 6,004,664, 5,141,685, and 6,130,278, and U.S. patent application Ser. No. 10/020,404, the contents of which are incorporated by reference herein.

The light reflecting region may comprise nanoparticle dispersions such as nanodispersions of aluminum or silver or other metals that can create a specularly reflecting ink. In one embodiment of this invention, a light emitting device comprises a specular light reflecting region which recycles the incident light from within the light emitting device to provide uniformity and the light output from the device is substantially collimated from a light redirecting element.

In one embodiment of this invention, the light reflecting region is a multilayer dielectric coating or a multilayer polymeric reflector film such as described in U.S. Pat. Nos. 7,038, 745, 6,117,530, 6,829,071, 5,825,543, and 5,867,316, the contents of which are incorporated by reference herein, or DBEF film produced by 3M. A multilayer polymeric reflective film can have a reflectance in the visible spectrum greater than 94% and thus can be more efficient in an optical system. The multi-layer polymeric reflector film may be specularly reflective, diffusely reflective, diffusely transmissive, anisotropically forward scattering or anisotropically backward scattering for one or more polarization states. In a light emitting device where the light reflecting regions are a multi-layer polymeric reflector, the low light loss enables more reflections before the light is absorbed and thus a cavity within the light emitting device can be made thinner, thus providing higher uniformity in a thinner form factor.

In one embodiment of this invention, the light reflecting element is a symmetrically diffusely reflecting white reflecting film, such as voided PET films, with or without additives such as titanium dioxide or barium sulfate. A specularly reflecting film may also be used such as metallized aluminized PET film or ESR multilayer reflective film from 3M Company or DBEF reflective polarizer film from 3M Company. Light reflecting elements can be composed of light transmitting materials. In another embodiment of this invention, a light emitting device comprises a volumetric asymmetrically reflecting element. The asymmetrically reflecting element may be an anisotropically backscattering volumetric diffuser, a volumetric forward asymmetrically scattering diffuser optically coupled to a specular reflector or other volumetric or surface relief based elements that reflect light anisotropically. In another embodiment of this invention, the reflector may be a metal such as aluminum or a metallic compound. The light reflecting element may be a sheet or other component or portion of the housing that is comprised of a light reflecting component or a metal or metallic layer or other reflecting component such as a polished aluminum housing. The light reflecting region may also be a brushed (or otherwise imparted with substantially linear features) aluminum or a brushed, embossed coating such that the element reflects anisotropically. In one embodiment of this invention, a light emitting device comprises a light reflecting element with a d/8 diffuse reflectance greater than one selected from 70%, 80%, 90%, or 95%. In a further embodiment of this invention, a light emitting device comprises an anisotropic light reflecting element with a d/8 diffuse reflectance greater than one selected from 70%, 80%, 90%, or 95%. In one embodiment of this invention, a light emitting device comprises a light reflecting film disclosed in at least one of U.S. Pat. Nos. 4,377,616, 4,767,675, 5,188,777, 6,497,946, 6,177, 153, and U.S. patent application Ser. No. 10/020,404, the contents of which are incorporated by reference herein.

Light Reflecting Region Location

Figure 22:
FIG. 22 is a depiction of four edge-lit light fixtures comprising a square light emitting region and a non-scattering region in accordance with one embodiment of this invention.
Figure 23:
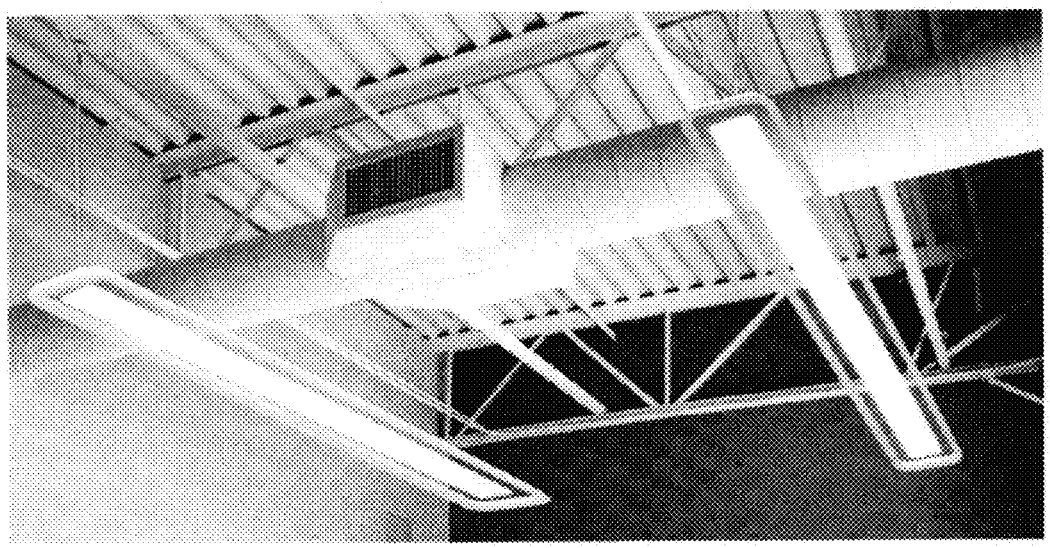
FIG. 23 is a computer generated rendering of two double edge-lit light fixtures comprising a rectangular light emitting region and a non-scattering region in accordance with one embodiment of this invention.
Figure 24:
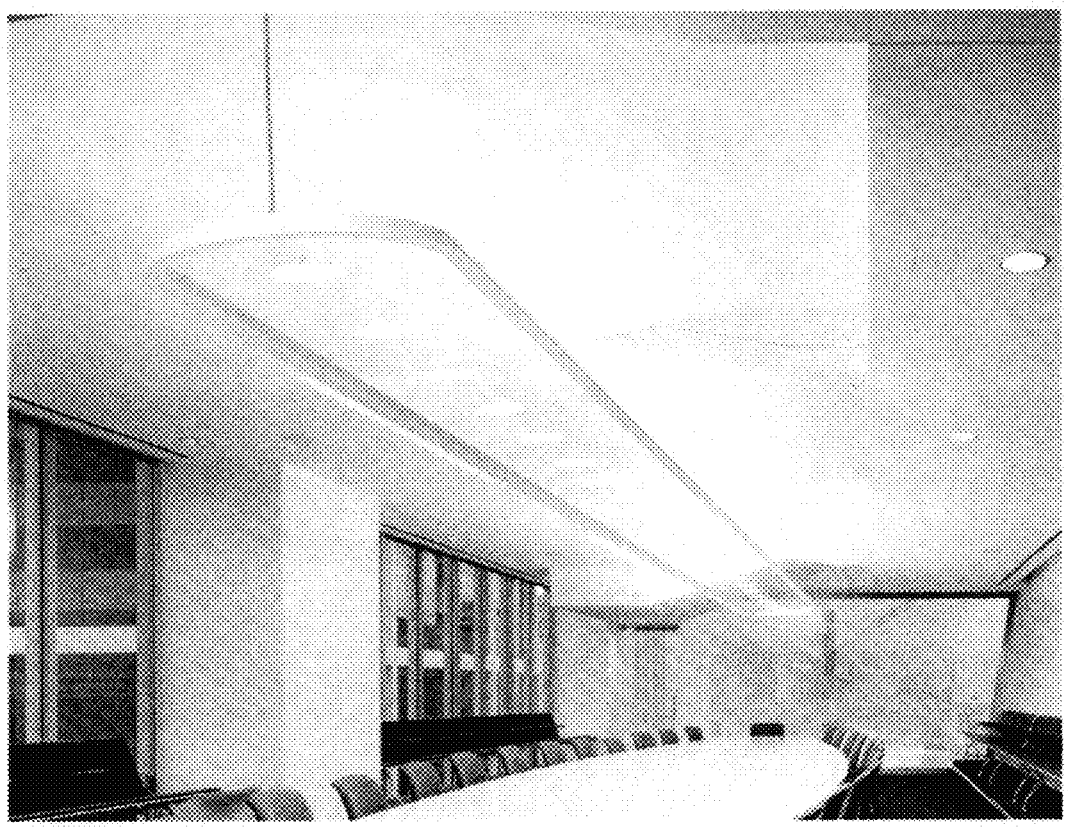
FIG. 24 is a computer generated rendering of a double edge-lit light fixture comprising multiple circular light emitting regions and a non-scattering region in accordance with one embodiment of this invention.
Figure 25:
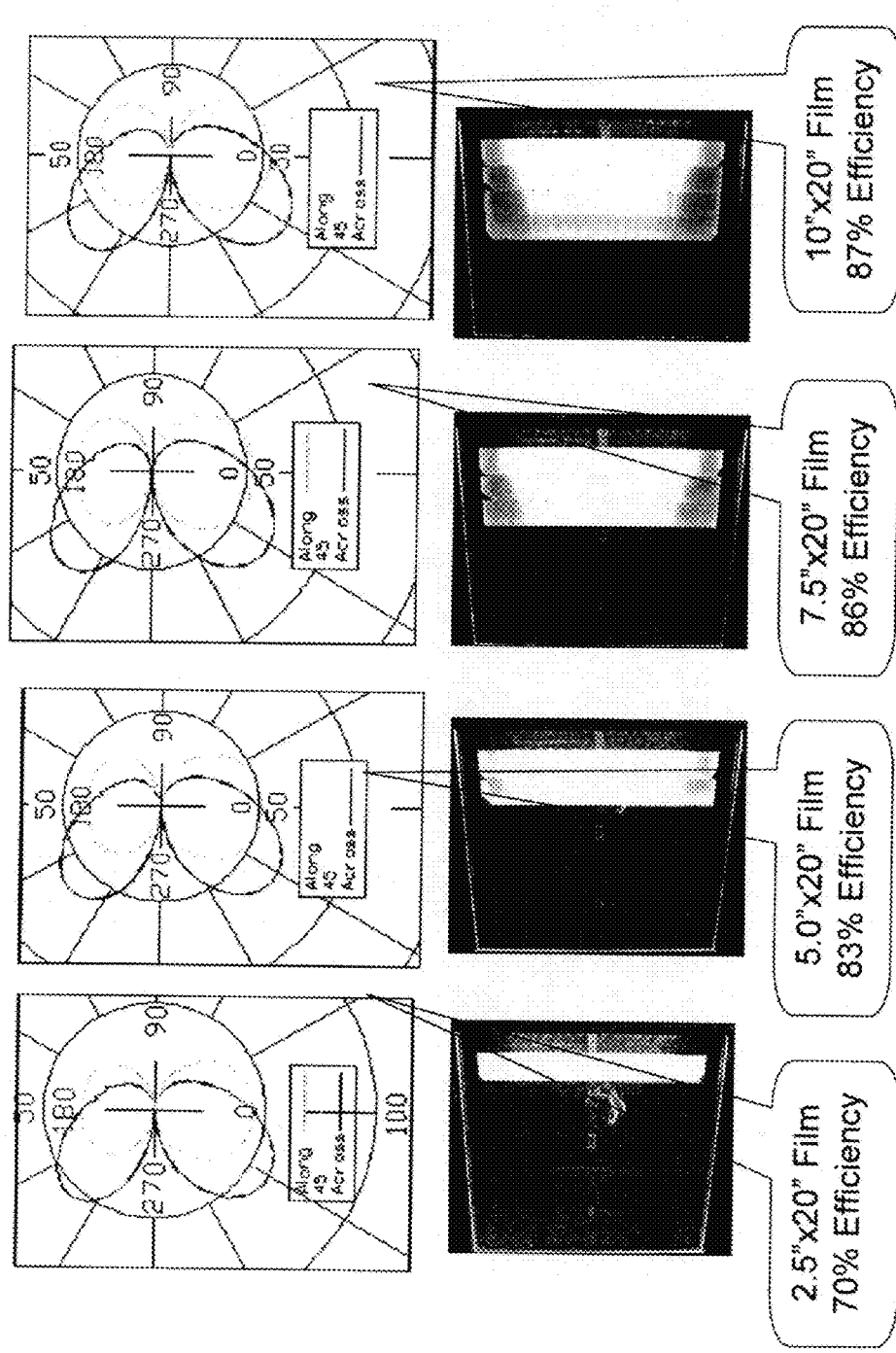
FIG. 25 is a report comprising the light output profiles, photographs, areas of the light extracting regions and optical efficiency of single edge-lit light fixtures comprising a 24 inch by 24 inch lightguide wherein the light extracting region is a volumetric light scattering diffuser film with asymmetric diffusing angles of 56°×2° with the major axis of diffusion oriented orthogonal the array of LEDs at an edge.
Figure 26:
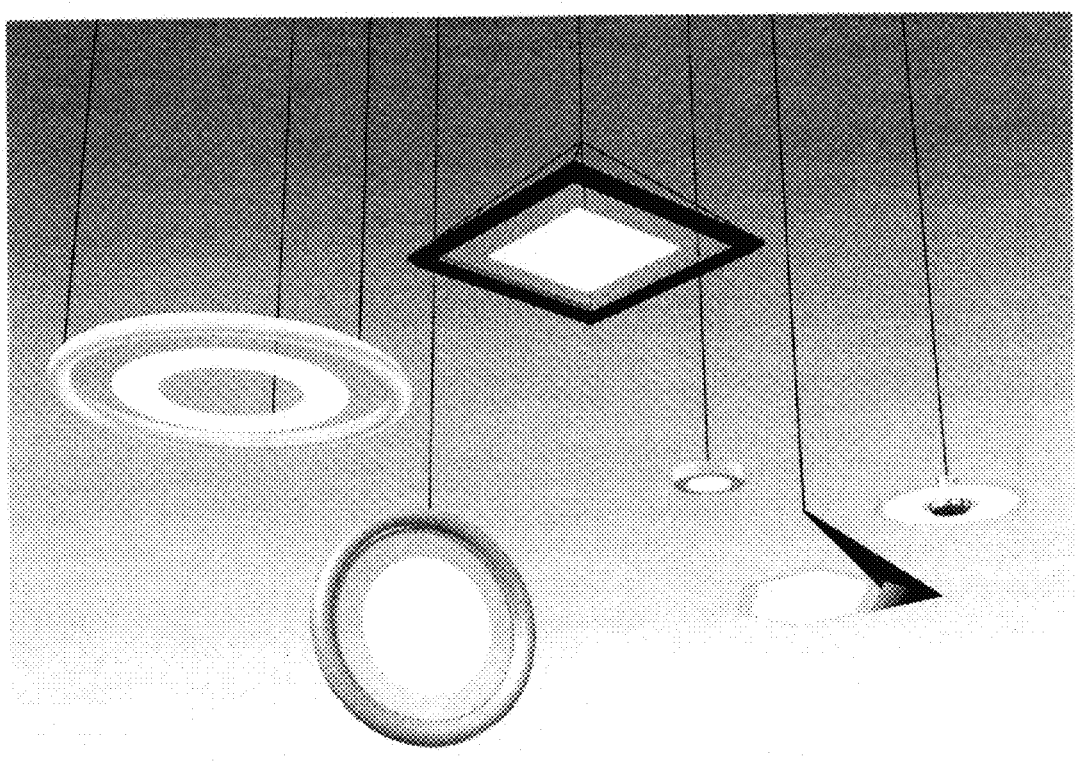
FIG. 26 is a computer generated rendering of multiple edge-lit light fixtures comprising light emitting regions and non-scattering regions in accordance with embodiments of this invention.
Figure 27:
FIG. 27 is a photograph of the output from a light fixture of the type shown in FIG. 15.
Figure 28:
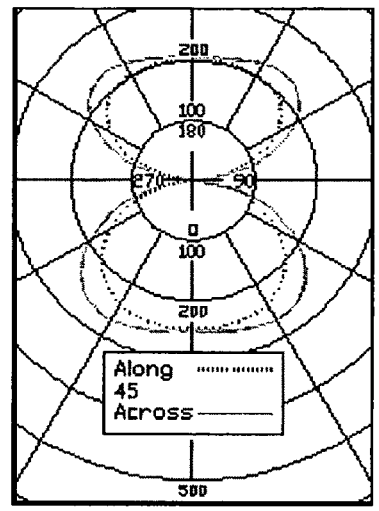
FIG. 28 is a report comprising the candela distribution, zonal lumen summary and angular light output profiles of the light fixture in FIG. 27.
Figure 29:
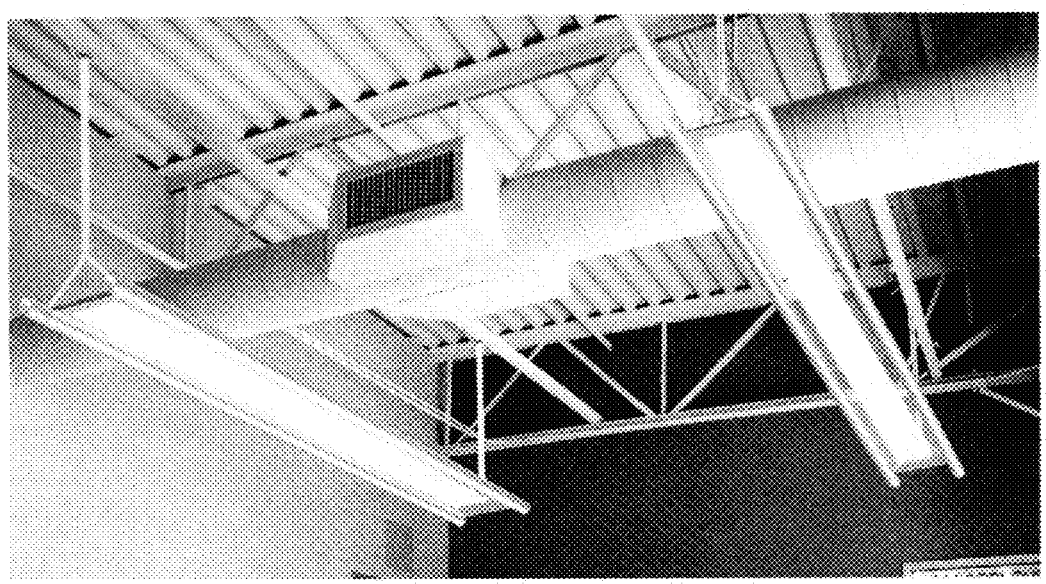
FIG. 29 is a computer generated rendering of a double edge-lit direct/indirect linear pendant light fixture of the type shown in FIG. 14 in accordance with one embodiment of this invention.
Figure 30:
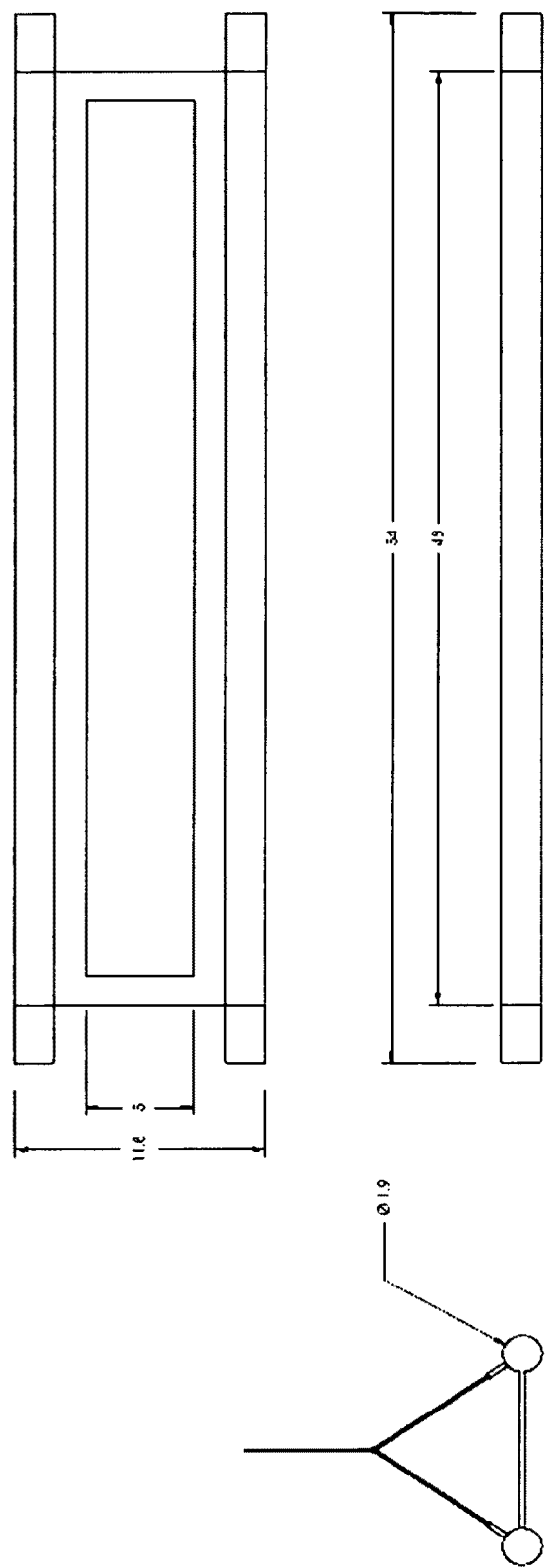
FIG. 30 are the dimensional drawings of the light fixture of FIG. 29 where the units are in inches in accordance with one embodiment of this invention.
Figure 31:
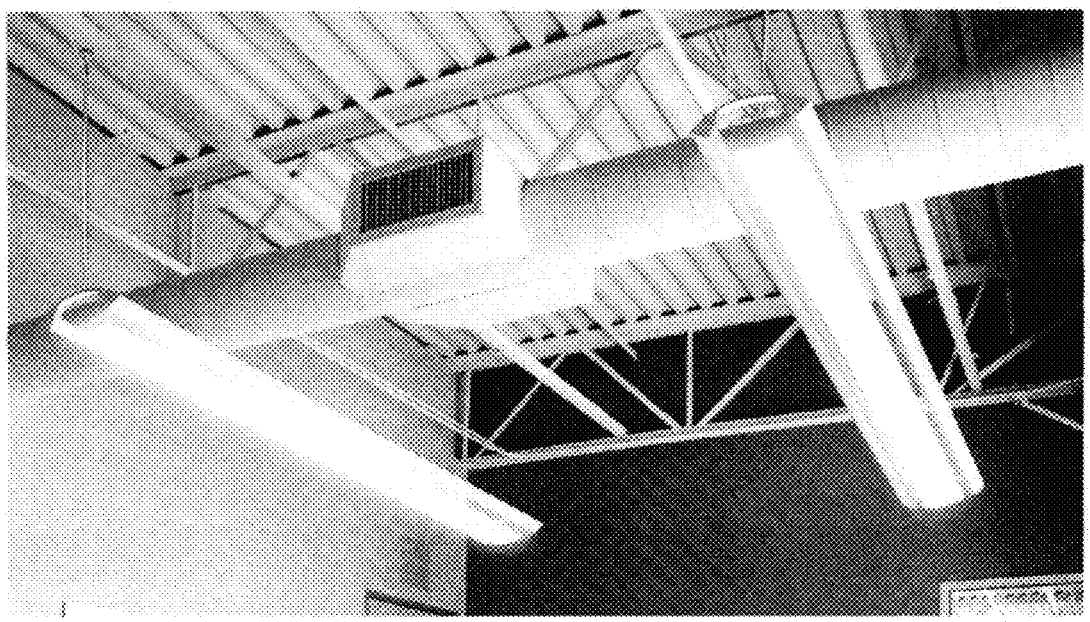
FIG. 31 is a computer generated rendering of two double edge-lit direct/indirect linear pendant light fixtures comprising lightguides curved in a convex form relative to the nadir in accordance with one embodiment of this invention.
Figure 32:
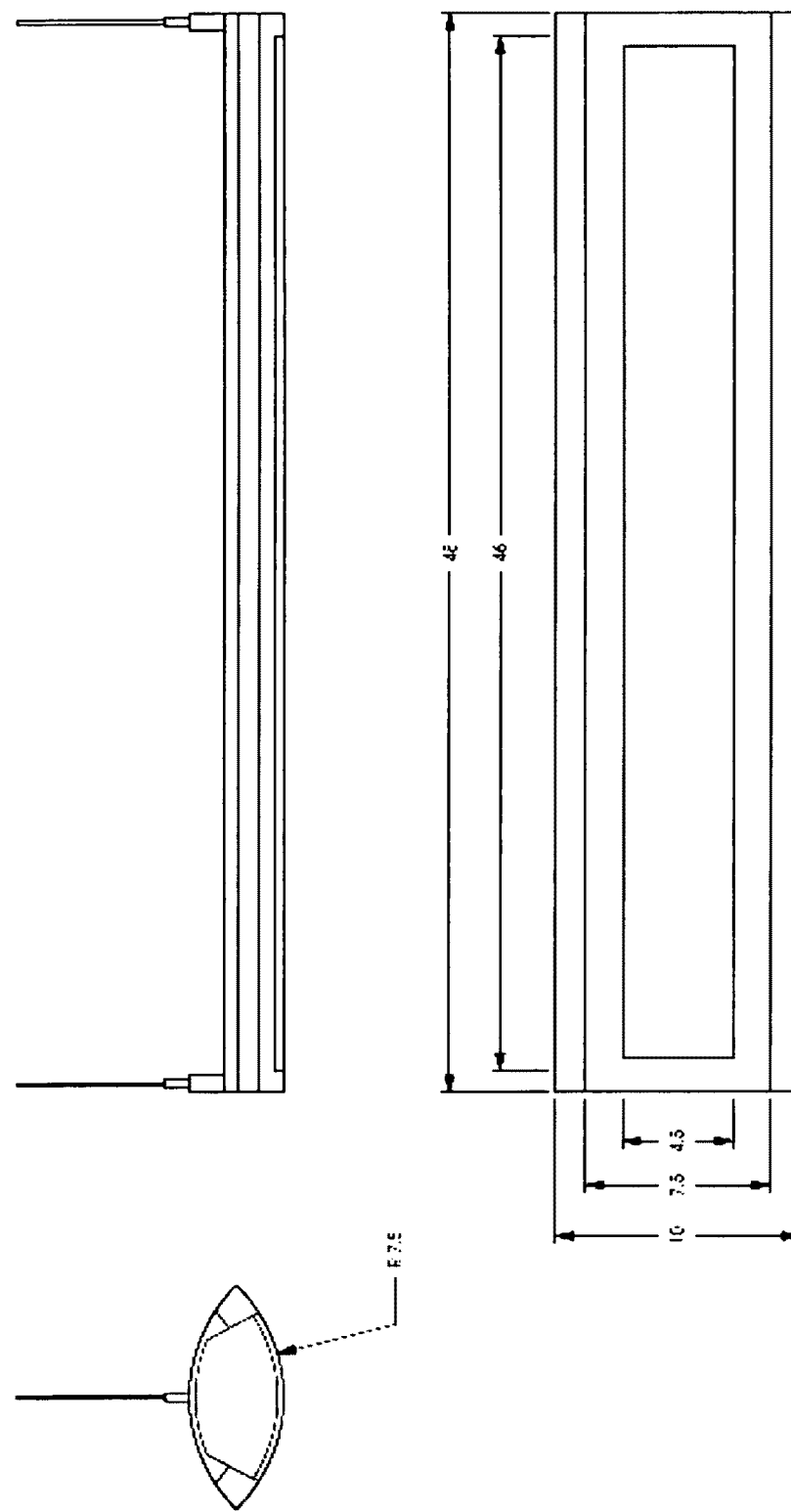
FIG. 32 are the dimensional drawings of the light fixture of FIG. 31 where the units are in inches in accordance with one embodiment of this invention.
Figure 33:
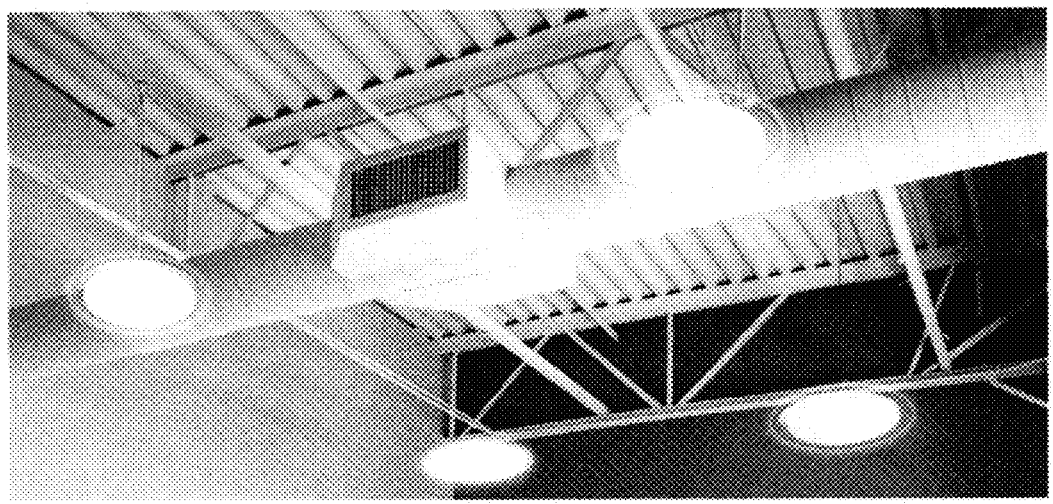
FIG. 33 is a computer generated rendering of four light fixtures illuminated from a central recessed region of the lightguide wherein a portion of the light emitting region is the light blocking region in accordance with one embodiment of this invention.
Figure 34:
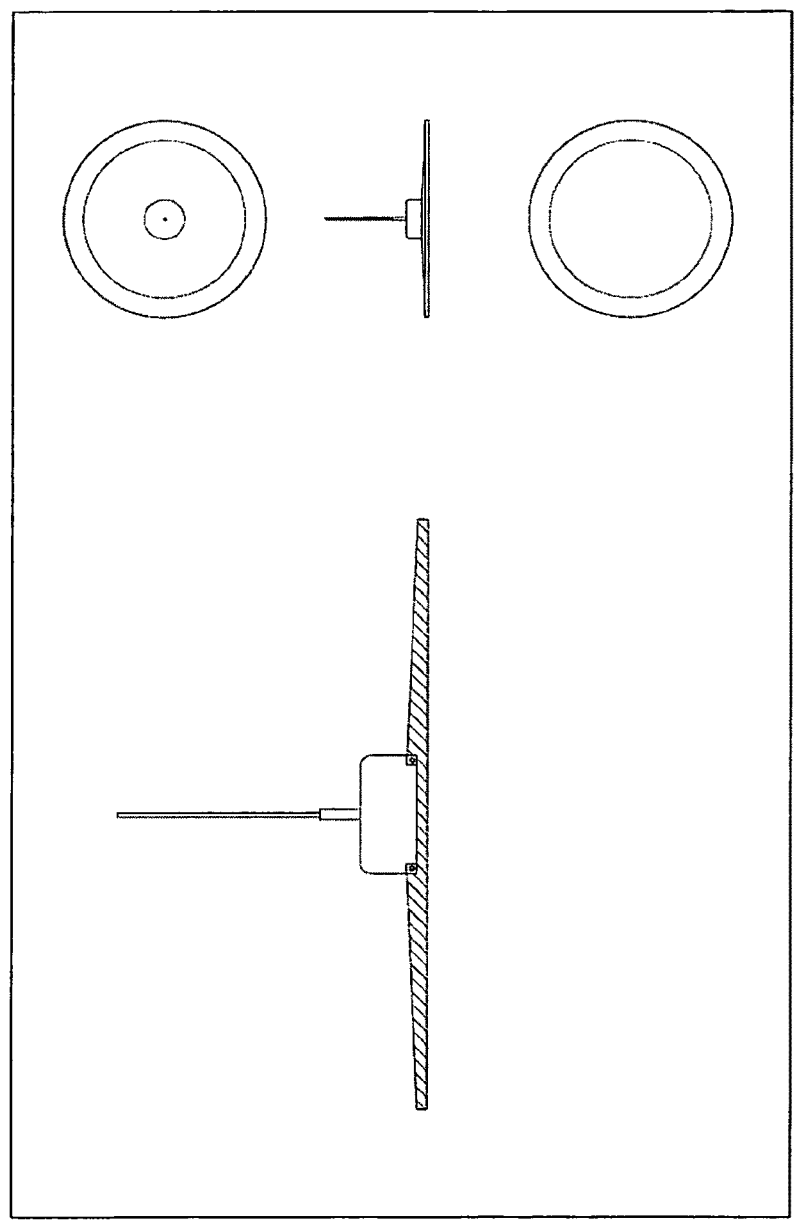
FIG. 34 comprises a cross-sectional, top, side, and bottom view of a light fixture in FIG. 33.

In one embodiment of this invention, a light emitting device comprises a light reflecting region disposed on the opposite side of a lightguide from a light emitting region. The light reflecting region, or a portion thereof, may located on the edges of the lightguide, the top surface, the bottom surface, a light output surface, inbetween the light sources, within an optical cavity of the light emitting device, optically coupled to the lightguide, spatially separated from the lightguide, or in other regions or locations commonly known in the lighting industry as being suitable for reflective surfaces or regions. In one embodiment of this invention, light reflecting region may be separated by a distance greater than the thickness of the lightguide in a direction orthogonal the surface of the lightguide. By separating the light reflecting region from the lightguide, the light extracted from the lightguide on the side of the light reflecting region may travel laterally to illuminate areas of the light reflecting region that may reflect light through non-scattering regions of the lightguide as illustrated in the recessed light fixture of FIG. 22. In one embodiment of this invention, a light emitting device comprises a lightguide with a non-scattering region disposed between a light blocking region and a light extracting region, a reflective region disposed at a distance greater than the thickness of the lightguide from the lightguide wherein the light reflecting region extends laterally past a first portion of the non-scattering region of the lightguide.

Angle of Peak Luminance

In one embodiment of this invention, a light emitting device comprising a curved lightguide and an LRE has a angular peak luminance of the light emitting region less than one selected from the group of 60°, 50° 40° and 30°. The angular luminance peak of the light emitted from a lightguide comprising a volumetric scattering region can be reduced to a lower angle by an LRE. This can reduce direct glare or visibility of the light emitting device when seen from high angles from the nadir. In one embodiment of this invention, a light emitting device comprises a curved lightguide, a linear lenticular lens array with radius of curvature less than 250 µm and an angular luminance peak of the central light emitting region of the light emitting surface less than 50° from the nadir in a plane orthogonal to the lenticules.

In another embodiment of this invention, the light emitting device has a ratio of the peak luminance to the luminance at 0° in a first output plane greater than or equal to one selected from the group of 1.2, 1.5, 2, 4, 6, and 10. In another embodiment of this invention, the light emitting device has a ratio of the luminance at one of 40°, 55°, or 65° to the luminance at 0° in a first output plane greater than or equal to one selected from the group of 1.2, 1.5, 2, 4, 6, and 10.

In one embodiment, the first output plane is perpendicular to the lenticules. The angular luminance peak can be reduced to a lower angle by an LRE. In one embodiment of this invention, a light emitting device comprises a curved lightguide, a linear lenticular lens array with radius of curvature less than 250 µm and a luminance peak less than 50° from the nadir in a plane orthogonal to the lenticules.

Angular Luminance Uniformity

The angular luminance uniformity of a light emitting device is defined as $$\text{Uniformity} = 100\% \times \frac{L_{min}}{L_{max}}$$

where $L_{max}$ is the maximum angular luminance and $L_{min}$ is the minimum angular luminance of a region of a the light output surface over specific angular range. In one embodiment of this invention, the angular luminance uniformity of the direct light from a light emitting region of a direct-indirect light fixtures is greater than one selected from 40%, 50%, 60%, 70%, 80% and 90% across the angular range of 0° to 55° degrees from the nadir or normal to the first output surface in a first output plane.

The LRE and the curvature of the lightguide may be designed to achieve a predetermined luminance uniformity in a first region of the light emitting region, such as a the center of the light emitting region, over a an angular range such as angles up to 45° or 55° from the nadir in a first output plane. In one embodiment of this invention, the luminance uniformity of the light emitting surface is greater than one selected from the group of 50%, 60%, 70%, 80% and 90% over a first luminance uniformity angular range in a first output plane.

The luminance uniformity angular range may be from a first angle to a second angle where the first and second angles are selected from the group of 0°, 10°, 20°, 30°, 40°, and 50°.

Spatial Luminance Uniformity

The luminance and luminance uniformity of the light emitting device of one embodiment of this invention is affected by the curve of the lightguide, the degree of scattering in the volumetric diffuser (the angular full width at half maximum intensity), the light redirecting properties of the LRE, the number, spacing and output profile of the light sources, and the dimensional size, shapes, and relative locations of the lightguide, LRE, and light sources. In one embodiment of this invention, a light redirecting element is used to redirect light from the lightguide and the luminance near the angle of peak luminance falls off significantly such that the luminance is not uniform angularly near the angle of peak luminance. In one embodiment of this invention, the luminance of the light emitting region of the light emitting device at a first angle varies from the center in direction parallel to the array of lenticular lens elements or lenticules. In another embodiment of this invention, a light emitting device comprising a curved lightguide has a light emitting region spatial luminance uniformity in a direction orthogonal to the array of lenticules at the angle of peak luminance, less than one selected from the group 80%, 70%, 60% and 50%.

The aforementioned elements affecting the luminance may also be configured to provide spatial luminance uniformity. In another embodiment of this invention, a light emitting device comprising a curved lightguide has a light emitting region spatial luminance uniformity in a direction orthogonal to the array of lenticules at the angle of peak luminance, greater than one selected from the group 80%, 70%, 60% and 50%.

FIG. 1 is a cross-sectional side view of a light fixture light emitting device in accordance with one embodiment of this invention. The following is a list of descriptions for the numerals represented in Figures.

100 Light emitting device
    101 Light blocking region
    102 Non-scattering light transmitting region
    103 Light emitting region
    104 Light output surface
    105 Light source
    106 Reflector
    107 Lightguide
    108 Light extracting region
    109 Volumetric light scattering element
    110 Light redirecting element (LRE)
    111 LRE support
    112 LRE substrate
    113 Air gap
    901 Indirect light (up)
    902 Direct light (down)
    903 Light reflecting region

EXAMPLES

Figure 2:
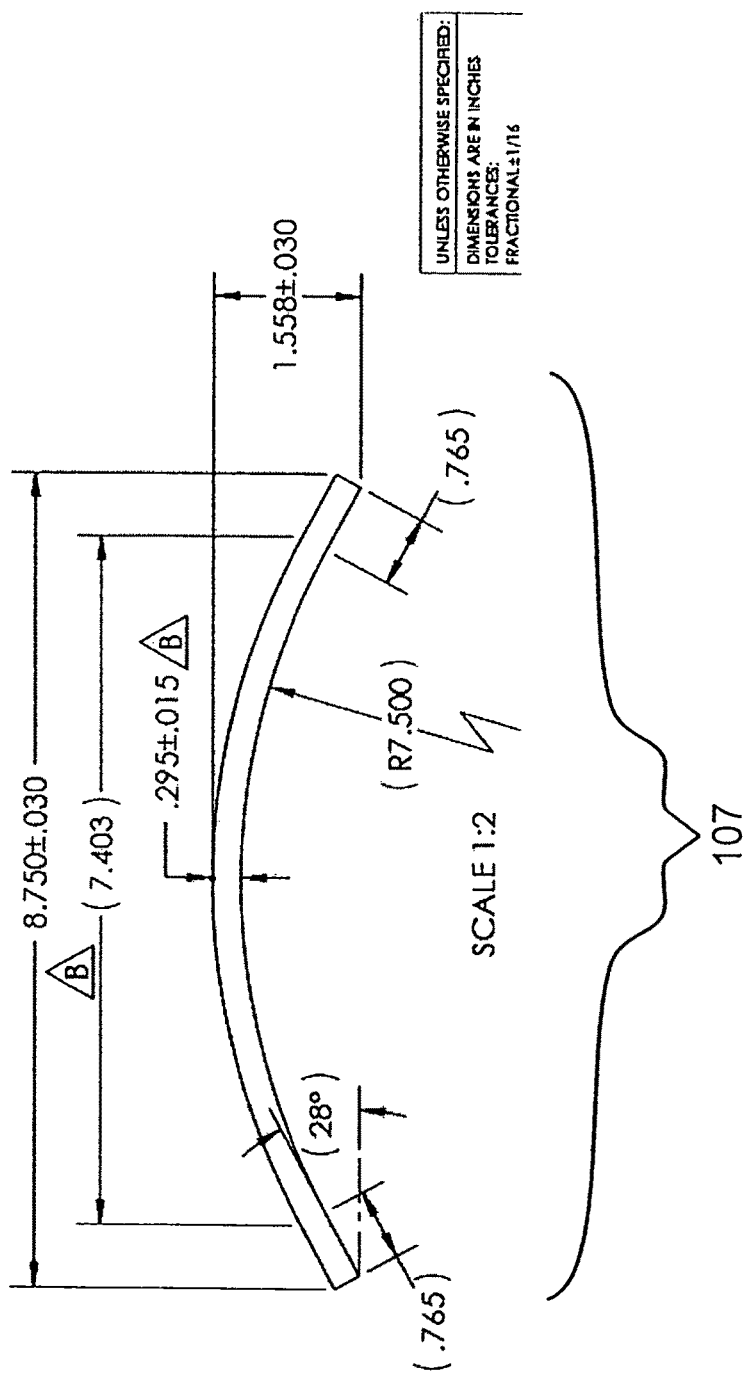
FIG. 2 is a cross-sectional side-view of the lightguide of FIG. 1
Figure 3:
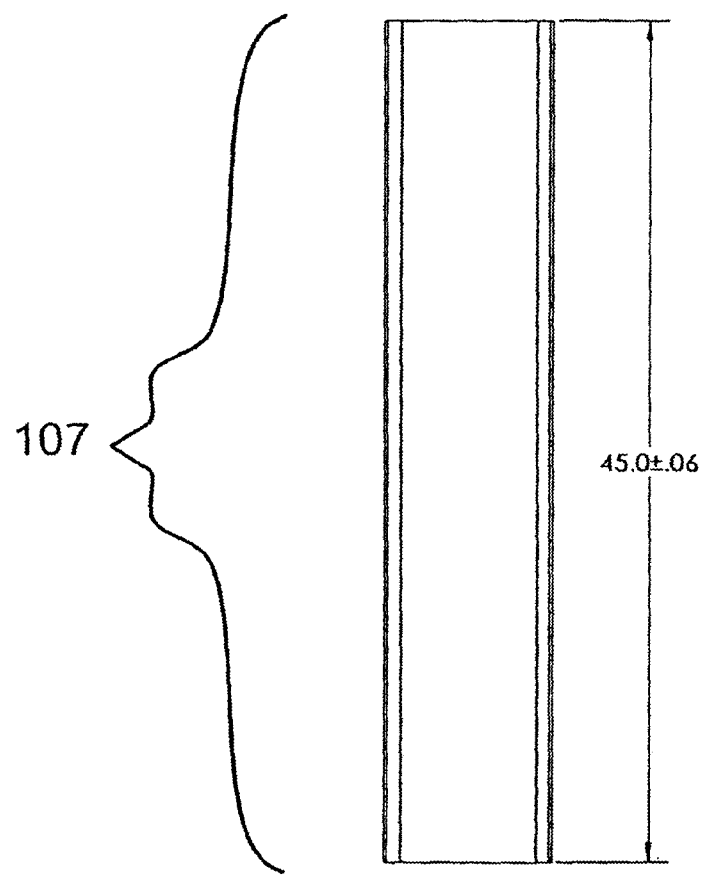
FIG. 3 is a top view of the lightguide of FIG. 1.
Figure 4:
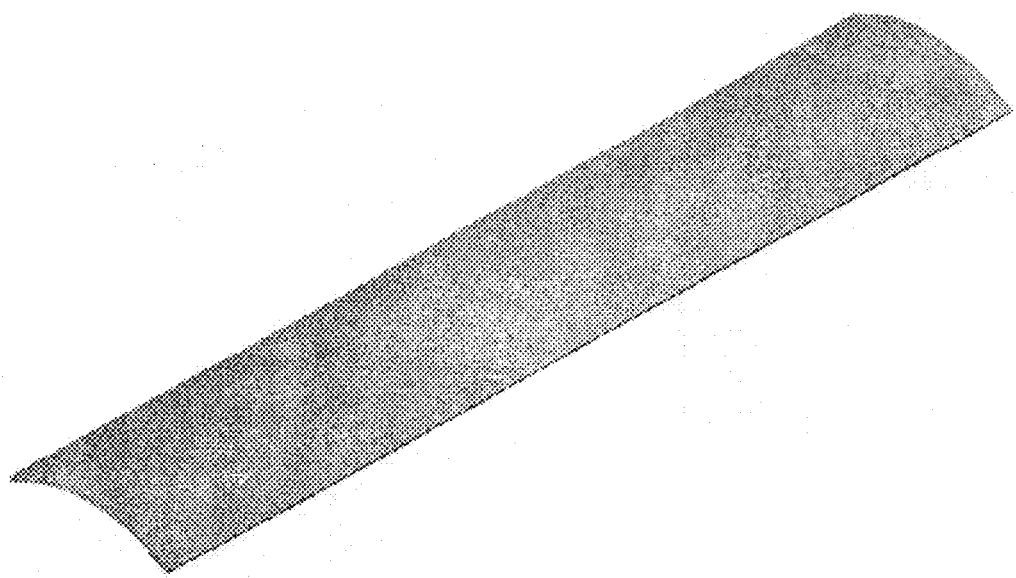
FIG. 4 is a shaded perspective view of the lightguide of FIG. 1.

A light emitting device comprises two linear arrays of light emitting diodes wherein the light from two linear arrays of light emitting diodes is coupled into a curved lightguide with straight segments disposed near the LEDs and substantially within a light blocking region and is illustrated in FIG. 1. The light blocking region reflects a first portion of light from the light emitting diodes, provides mechanical support to the lightguide, obscures light that does not directly couple into the lightguide in a waveguiding condition, and provides thermal transfer properties to conduct heat from the LEDs. The curved lightguide has a light output surface comprising a light emitting region substantially centered within the light output surface. The area of the light emitting region is smaller than the output surface of the lightguide and has a non-scattering light transmitting region disposed between the light emitting region and the light blocking region. The light extracting region comprises a volumetric light scattering film with a first angular FWHM transmitted intensity in a first plane of collimated light incident at zero degrees. FIG. 2 is a close-up side-view of the lightguide of FIG. 1 further showing dimensions and angles. FIG. 3 is a top view of the lightguide of FIG. 1. FIG. 4 is a shaded perspective view of the lightguide of FIG. 1.

Figure 9:
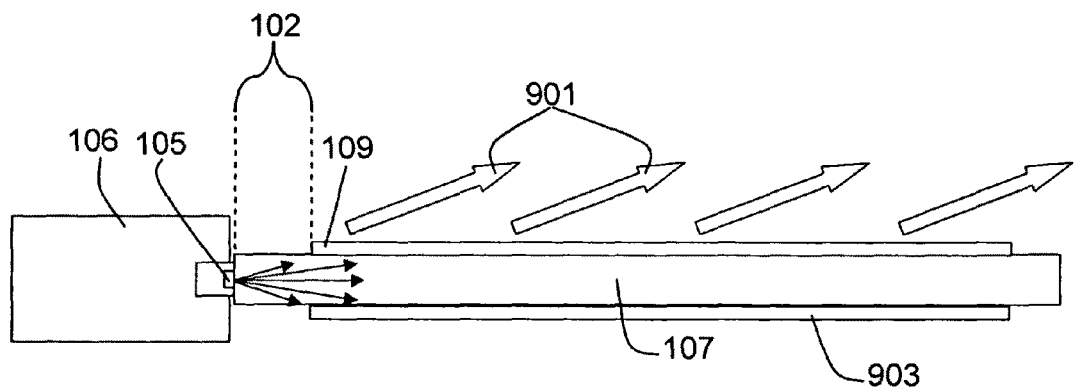
FIG. 9 is a cross-sectional side view of a single edge-lit indirect light fixture in accordance with one embodiment of this invention.

FIG. 9 illustrates a cross-sectional view of a single edge-lit indirect light fixture according to one embodiment of the present invention. The light fixture of FIG. 9 comprises a reflector and a light source at least partially disposed in the reflector and positioned to provide light to the lightguide at a first location. In some embodiments, the light source comprises a plurality of light emitting diodes or other light sources operable to provide light to the lightguide at a plurality of locations along the edge of the lightguide. The light fixture comprises a volumetric light scattering element optically coupled to the lightguide and a light reflecting region in facing opposition to the volumetric light scattering element. A substantially non-scattering region of the lightguide is disposed between the lightsource and the volumetric light scattering element. In some embodiments, as discussed further herein, the substantially non-scattering region is at least partially visible to an observer and forms a partial or complete border around the volumetric light scattering element. At least a portion of light transmitted by the lightguide is extracted by the volumetric light scattering element and emitted upward from the light fixture as an indirect light output.

Figure 10:
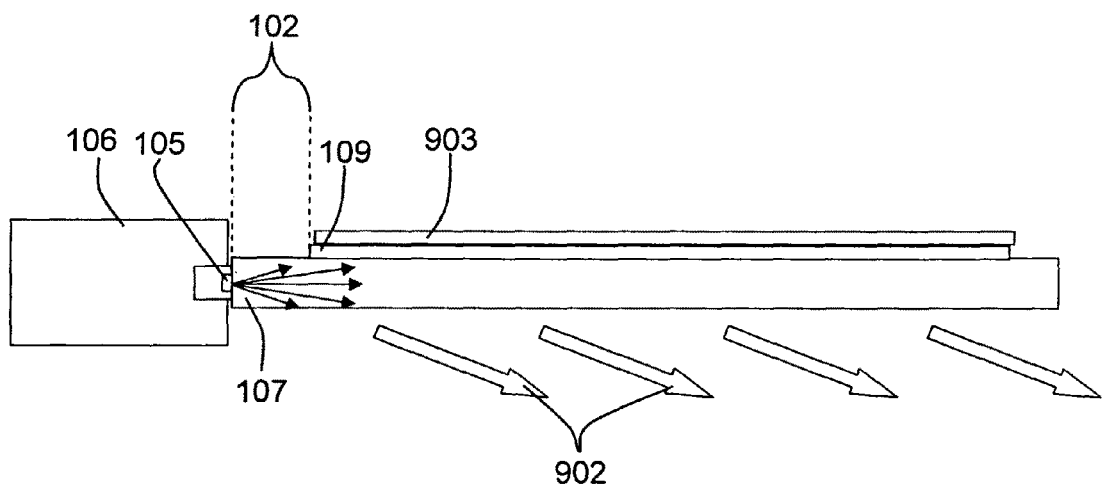
FIG. 10 is a cross-sectional side view of a single edge-lit direct light fixture in accordance with one embodiment of this invention.

FIG. 10 illustrates a cross-sectional view of a single edge-lit direct light fixture according to one embodiment of the present invention. In the embodiment illustrated in FIG. 10, the light reflecting region is disposed on the same side of the lightguide as the volumetric light scattering element. At least a portion of light transmitted by the lightgude is extracted and emitted downward from the light fixture as a direct light output.

Figure 11:
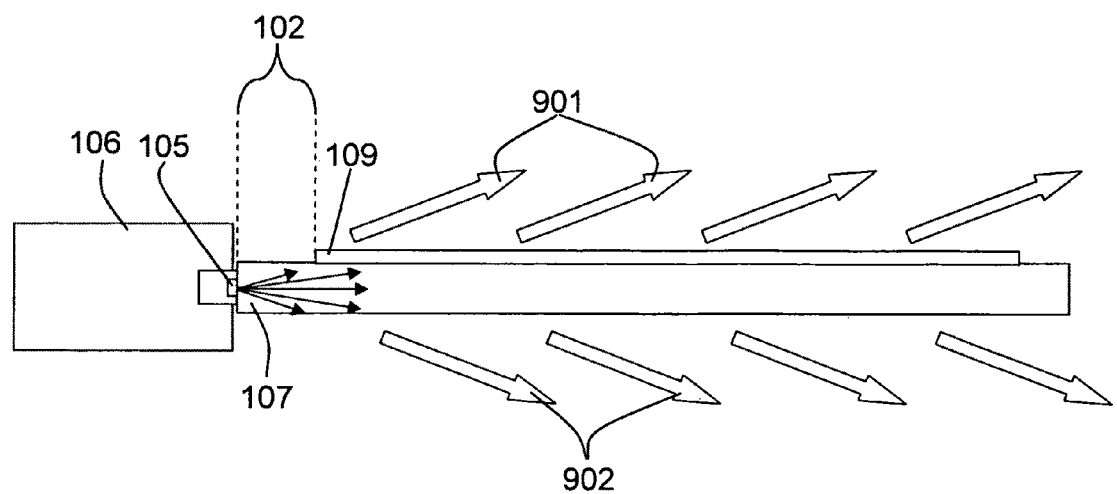
FIG. 11 is a cross-sectional side view of a single edge-lit direct/indirect light fixture in accordance with one embodiment of this invention.
Figure 13:
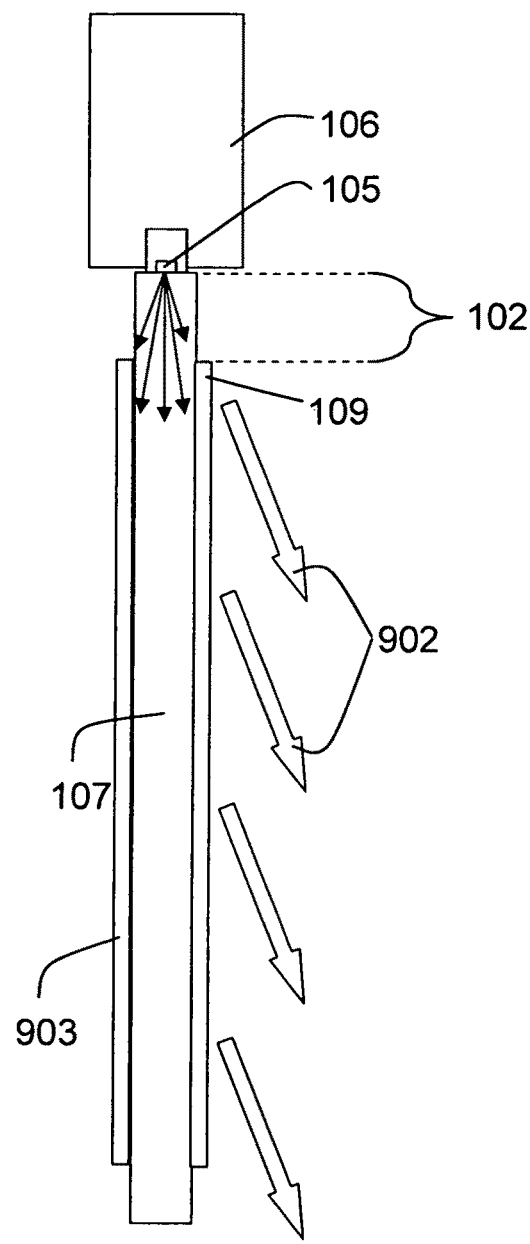
FIG. 13 is a cross-sectional side view of a single edge-lit direct light fixture oriented vertically in accordance with one embodiment of this invention.
Figure 14:
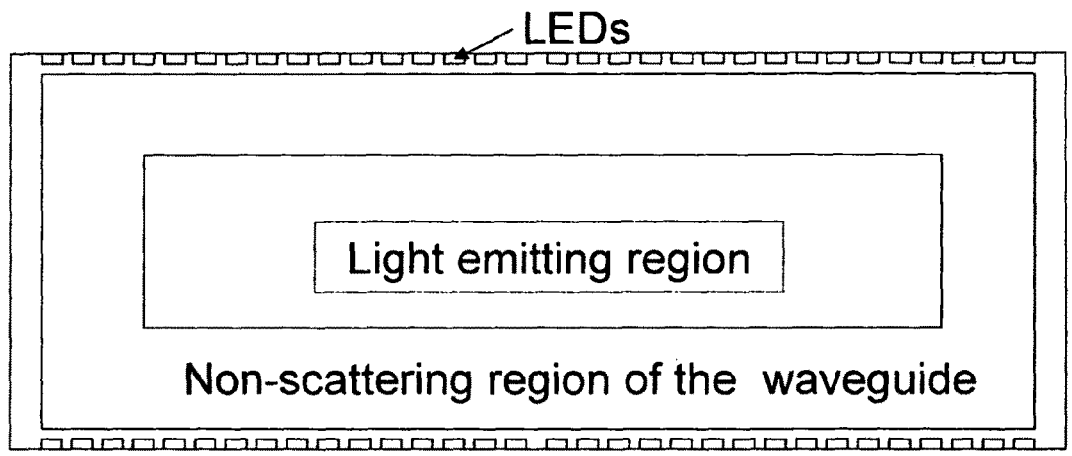
FIG. 14 is an underside view of a double edge-lit light fixture comprising a rectangular light emitting region in accordance with one embodiment of this invention.
Figure 15:
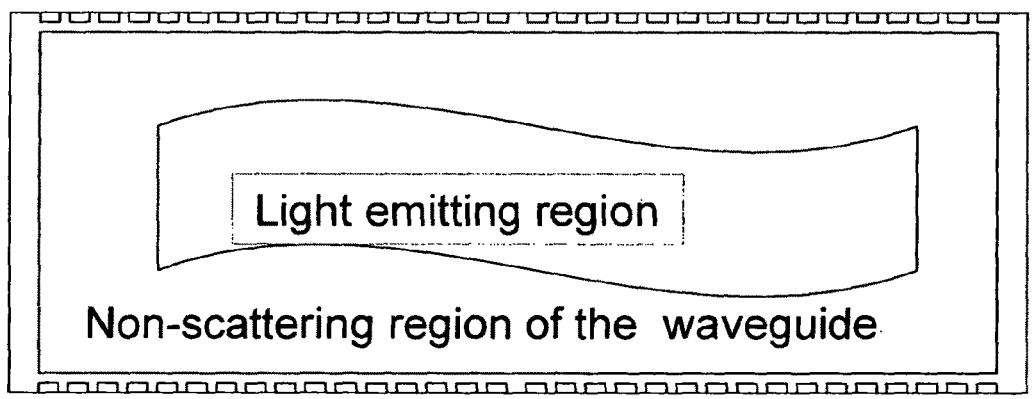
FIG. 15 is an underside view of a double edge-lit light fixture comprising a wave-like shaped light emitting region in accordance with one embodiment of this invention.
Figure 16:
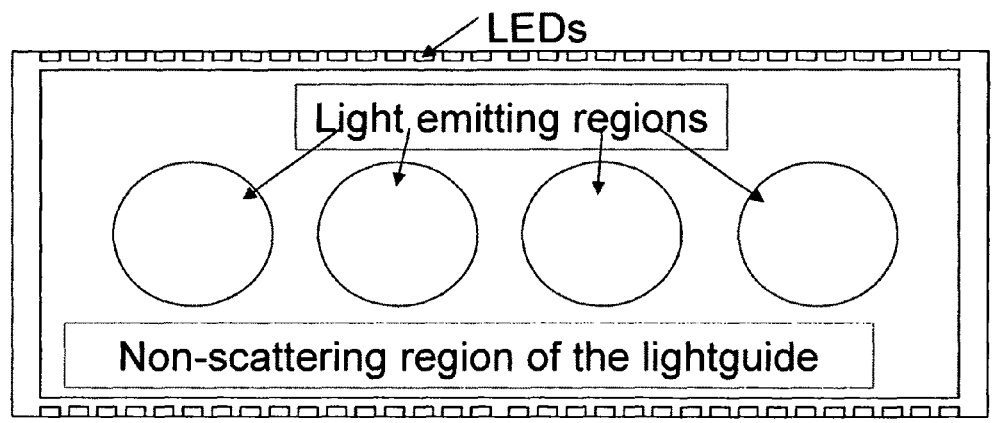
FIG. 16 is an underside view of a double edge-lit light fixture comprising substantially circular light emitting regions in accordance with one embodiment of this invention.
Figure 17:
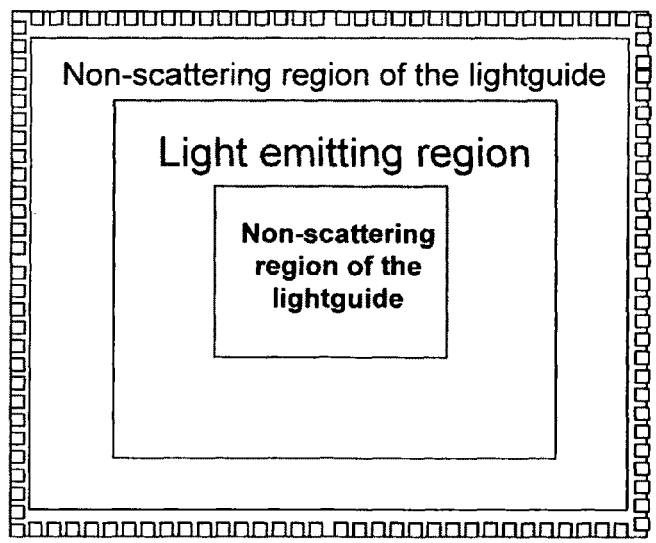
FIG. 17 is an underside view of a quadruple edge-lit light fixture comprising a rectangular non-scattering region enclosed by a rectangular light emitting region wherein any point on the light emitting region is disposed between two non-scattering regions in accordance with one embodiment of this invention.
Figure 18:
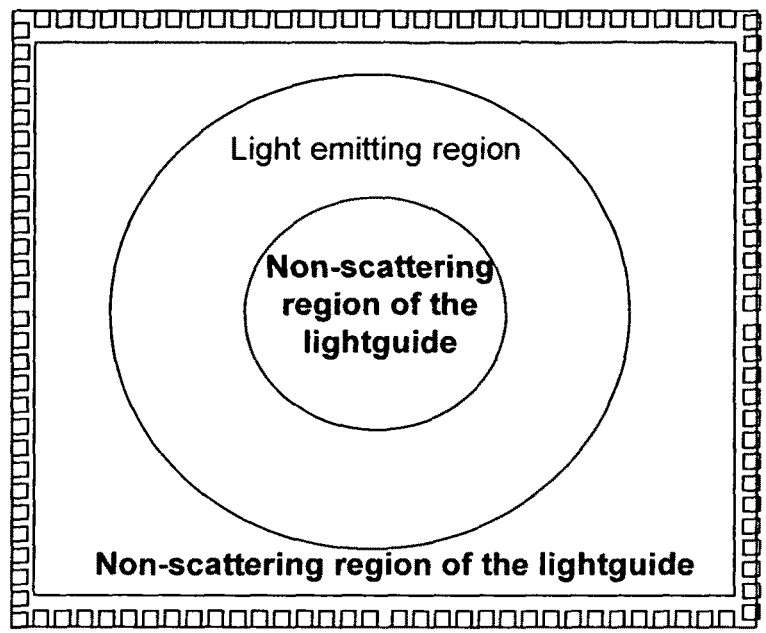
FIG. 18 is an underside view of a quadruple edge-lit light fixture comprising a circular non-scattering region enclosed by a circular light emitting region wherein any point on the light emitting region is disposed between two non-scattering regions in accordance with one embodiment of this invention.
Figure 19:
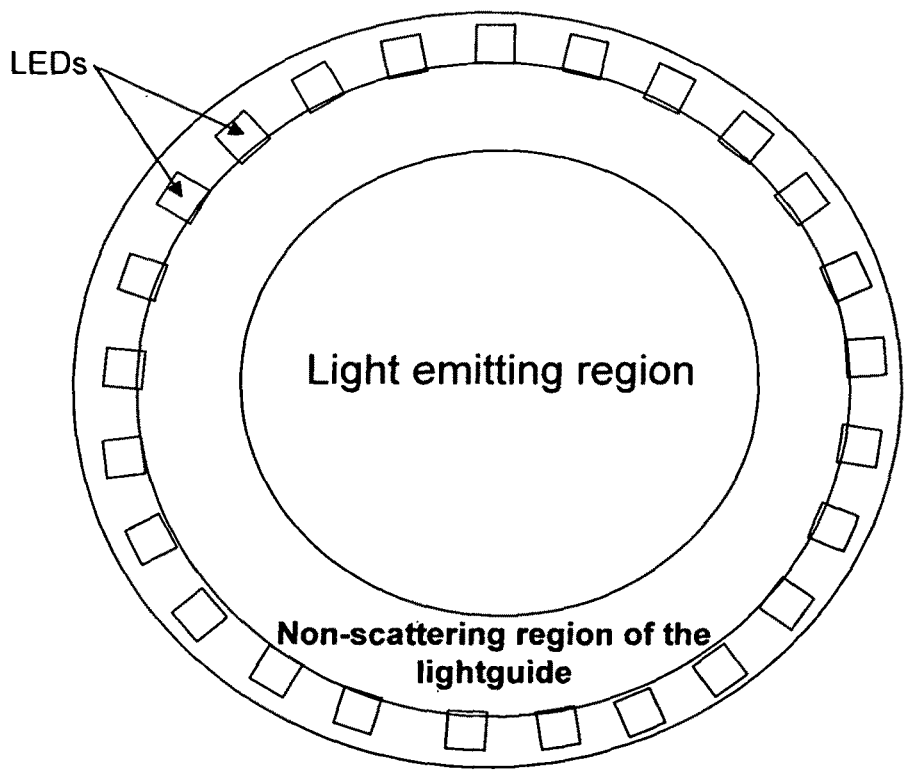
FIG. 19 is an underside view of a circularly illuminated edge-lit light fixture comprising a non-scattering region disposed between the LEDs and a circular light emitting region in accordance with one embodiment of this invention.
Figure 20:
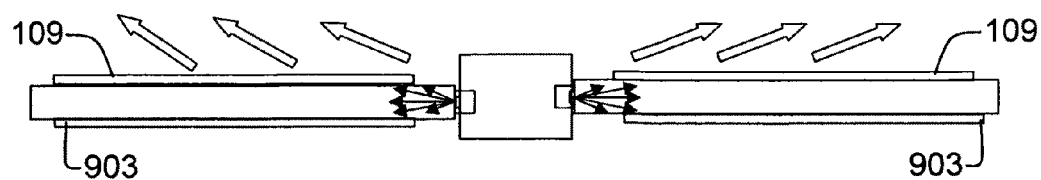
FIG. 20 is an cross-sectional side view of an edge-lit indirect light fixture wherein the LEDs are disposed in a central region with their optical axis directed away from the central region and a non-scattering region is disposed between a light blocking region and a light emitting region in accordance with one embodiment of this invention.
Figure 21:
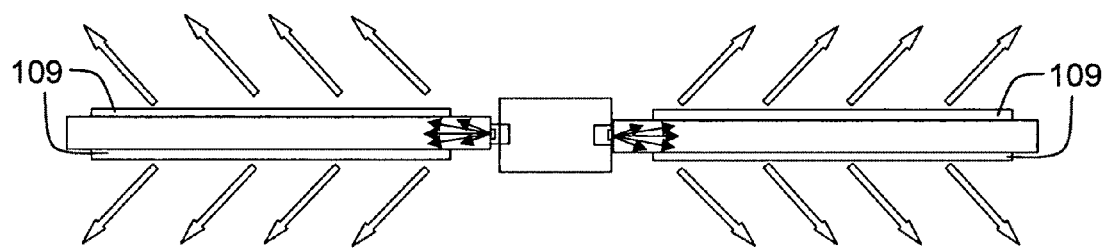
FIG. 21 is an cross-sectional side view of an edge-lit direct/indirect light fixture wherein the LEDs are disposed in a central region with their optical axis directed away from the central region and a non-scattering region is disposed between a light blocking region and a light emitting region in accordance with one embodiment of this invention.

FIG. 11 illustrates a cross-sectional view of a single edge-lit indirect light fixture according to one embodiment of the present invention. The light fixture of FIG. 11 comprises a reflector and a light source at least partially disposed in the reflector and positioned to provide light to the lightguide at a first location. In some embodiments, the light source comprises a plurality of light emitting diodes or other light sources operable to provide light to the lightguide at a plurality of locations along the edge of the lightguide. The light fixture comprises a volumetric light scattering element optically coupled to the lightguide. A substantially non-scattering region of the lightguide is disposed between the lightsource and the volumetric light scattering element. In some embodiments, as discussed further herein, the substantially non-scattering region is visible to an observer and forms a partial or complete border around the volumetric light scattering element. At least a first portion of light transmitted by the lightguide is extracted by the volumetric light scattering element and emitted upward from the light fixture as an indirect light output, and at least a second portion of light transmitted by the lightguide is extracted by the volumetric light scattering element and emitted downward as a direct light output.

Figure 35:
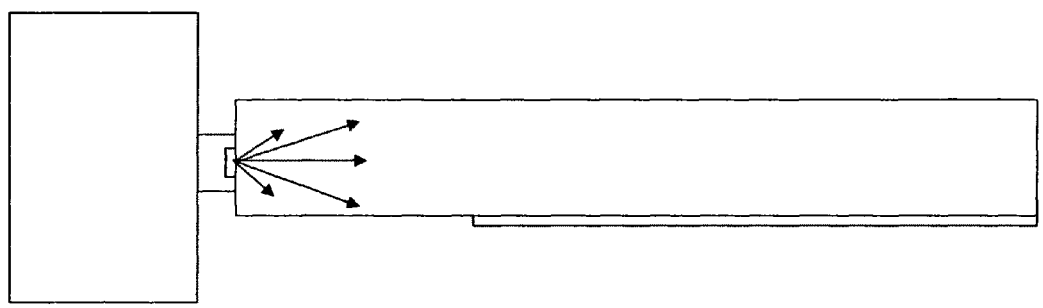
FIG. 35 is a cross-sectional side view of edge-lit light fixture comprising a lightguide with a non-curved light input edge in accordance with one embodiment of this invention.
Figure 36:
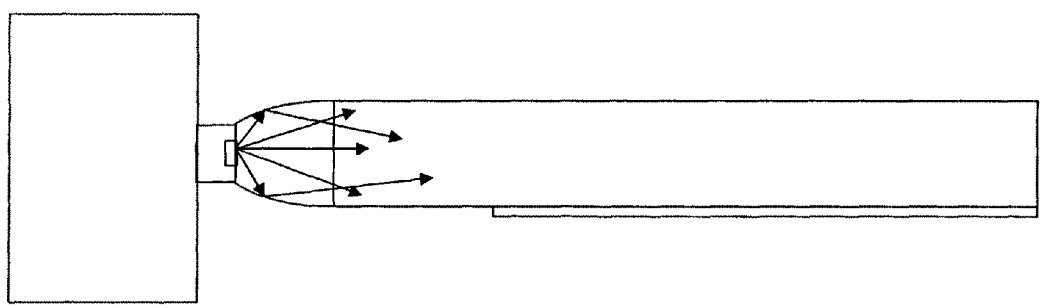
FIG. 36 is a cross-sectional side view of edge-lit light fixture comprising a lightguide with a curved light input edge in accordance with one embodiment of this invention.
Figure 37:
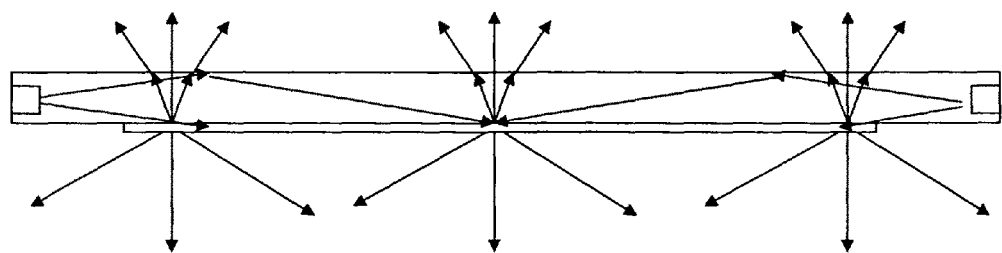
FIG. 37 is a cross-sectional side view of a double edge-lit direct/indirect light fixture comprising a light extracting volumetric scattering element on the bottom surface of the lightguide depicting the increased angular width of the direct light relative to the indirect light in accordance with one embodiment of this invention.
Figure 38:
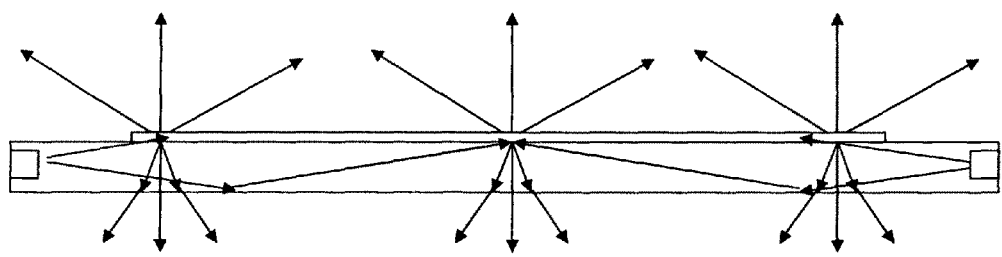
FIG. 38 is a cross-sectional side view of a double edge-lit direct/indirect light fixture comprising a light extracting volumetric scattering element on the top surface of the lightguide depicting the increased angular width of the indirect light relative to the direct light in accordance with one embodiment of this invention.

In some embodiments, an edge of a lightguide can comprise one of a variety of shapes. An edge of a lightguide, in some embodiments, is tapered, beveled, convex or concave or combinations thereof. FIG. 36 is a cross-sectional side view of an edge-lit fixture comprising a lightguide with a curved light input edge according to one embodiment of the present invention. In some embodiments, an edge of a lightguide is non-curved or straight. FIG. 35 is a cross-sectional side view of an edge-lit light fixture comprising a lightguide with a non-curved light input edge according to one embodiment of the present invention.

Figure 5:
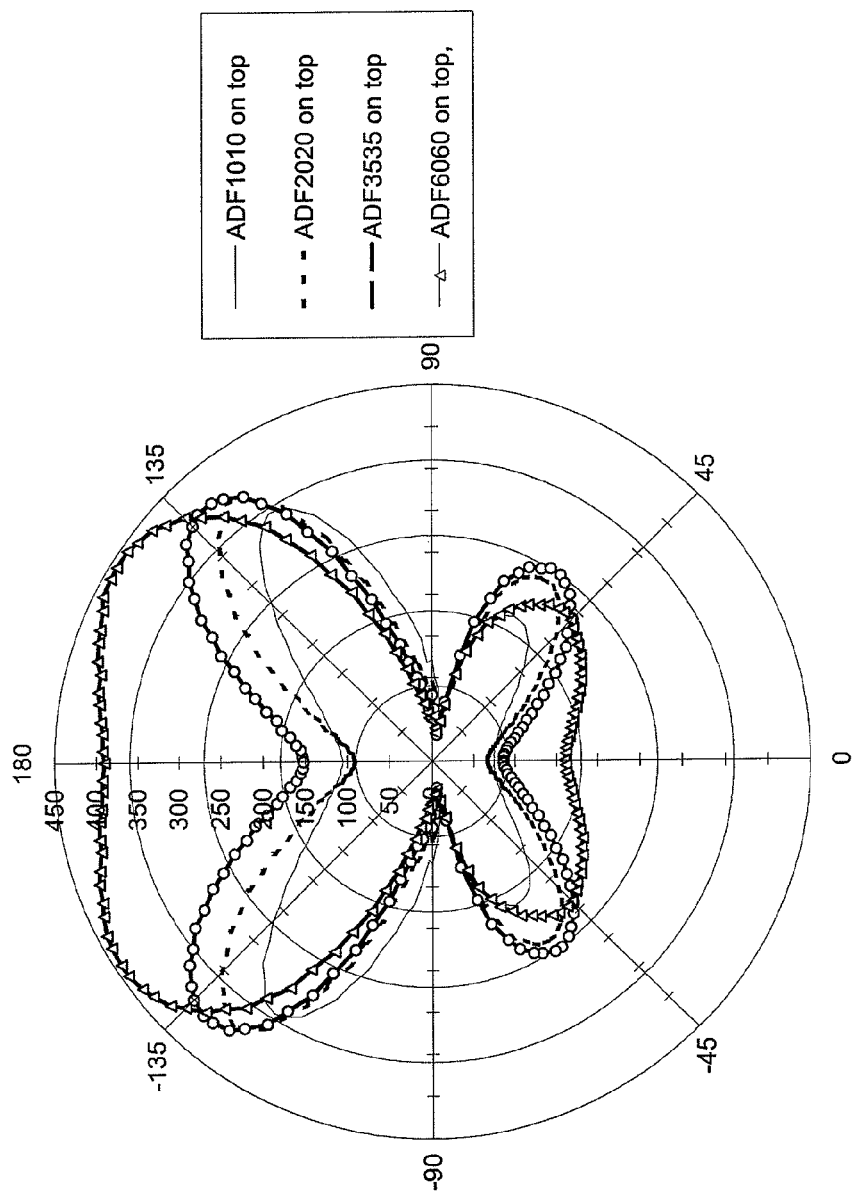
FIG. 5 is a chart depicting the measurements of the angular far-field luminous intensity of the output from a light fixture of one embodiment of this invention with different volumetric light scattering films.

Different volumetric light scattering films were optically coupled to the lightguide and the angular far-field luminous intensity of the output from a light fixture comprising the lightguide, two arrays of LEDs, a light blocking region and a non-scattering region were measured and the results are shown in FIG. 5.

FIG. 5 illustrates the far-field photometric profile of a light fixture produced comprising the components illustrated in FIG. 1 except for the LRE. Different symmetrically scattering volumetric light scattering films were optically coupled to the lightguide and the angular far-field luminous intensity of the output from the light fixture in a plane orthogonal to the array of LEDs was measured. The different volumetric light scattering films optically coupled to the lightguide are a 10°×10° angular FWHM diffuser (ADF1010), a 20°×20° angular FWHM diffuser (ADF2020), a 35°×35° angular FWHM diffuser (ADF3535), and a 60°×60° angular FWHM diffuser (ADF6060). The luminous intensity shown in FIG. 5 illustrates the affect of increasing the angular FWHM of the volumetric light scattering film on the light output profile. Table 4 summarizes the angular widths in degrees of the lobes and the angles of the peak luminous intensity extracted from the data presented in FIG. 5. In the case of the ADF6060, there is only one lobe for the direct and one lobe for the indirect when using the 50% maximum criteria for the FWHM angular width. The peak angles are the angles of peak luminous intensity of the side lobes (in degrees) from the vertical.

TABLE 4

|  | Units | Indirect side lobe angular width | Direct side lobe angular width | Indirect side lobe peak | Direct side lobe peak |
|---|---|---|---|---|---|
| ADF1010 | ° | 50 | 45 | 123 | 60 |
| ADF2020 | ° | 45 | 40 | 125 | 58 |
| ADF3535 | ° | 53 | 50 | 133 | 55 |
| ADF6060 | ° | 130 (single lobe) | 150 (single lobe) | 145 | 48 |

In one embodiment of this invention, the FWHM angular width of the side lobes of the luminous intensity from the light fixture remains within an angular range of 35° to 55°. In the fixture measured for the data for FIG. 5, the peak angle of luminous intensity associated with the side lobes, in both the direct and indirect light output from the fixture, moves closer to the vertical or normal to the light output surface at the center of the fixture, thus closer to 0° and 180° for the direct and indirect light output, respectively.

In one embodiment of this invention, a light fixture comprises at least two light sources illuminating two edges of a lightguide comprising a volumetric light scattering film and a non-scattering region wherein the angular peaks of the direct side lobes are between 45° and 60° from the vertical or normal to the light output surface and the angular peaks of the indirect side lobes are between 120° and 150° from the vertical or normal to the light output surface.

Figure 6:
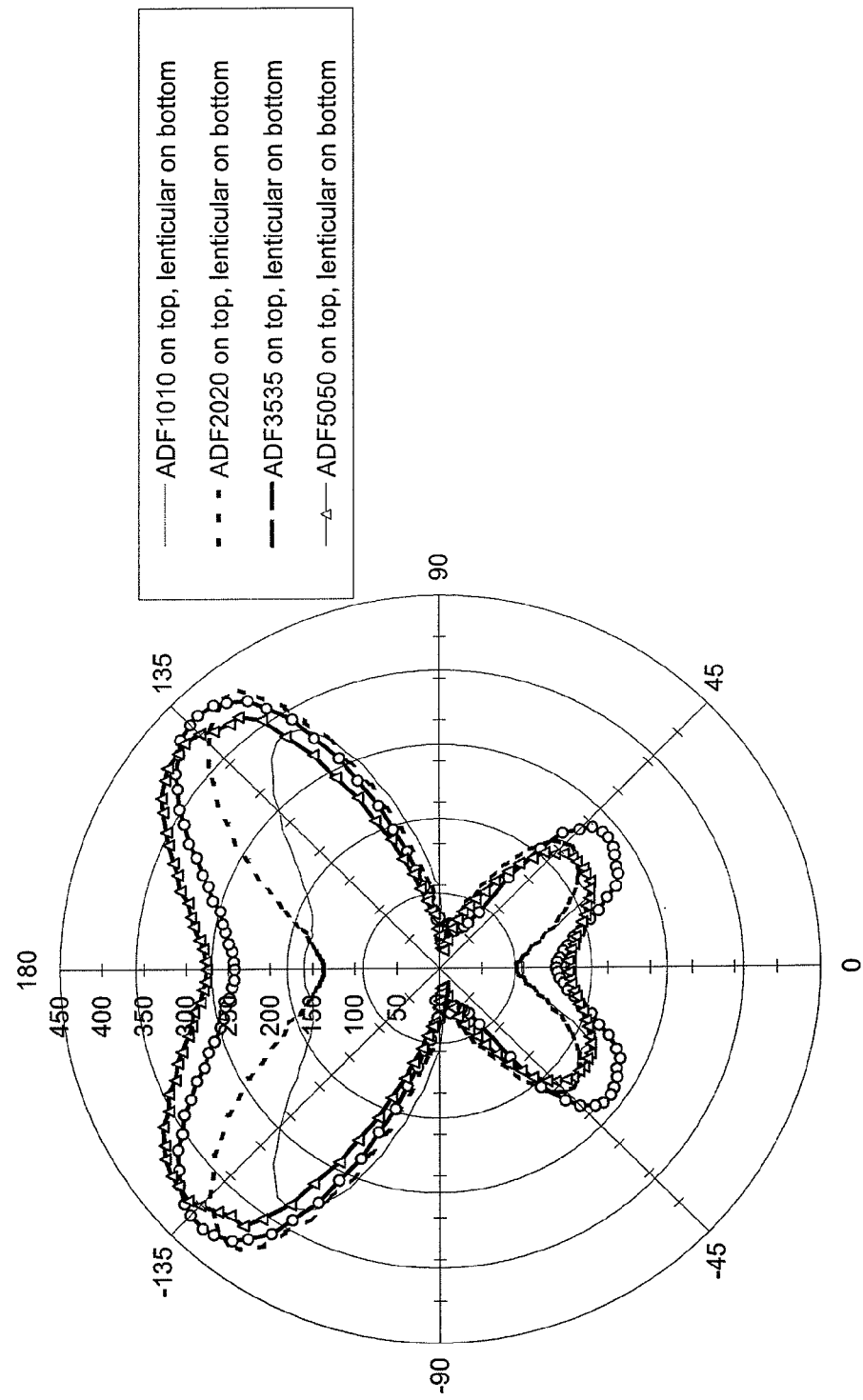
FIG. 6 is a chart depicting the measurements of the angular far-field luminous intensity of the output from a light fixture of one embodiment of this invention with different volumetric light scattering films and a light redirecting element.

Different volumetric light scattering films were optically coupled to the lightguide and the angular far-field luminous intensity of the output from a light fixture comprising the lightguide, two arrays of LEDs, a light blocking region, a light redirecting element and a non-scattering region were measured and the results are shown in FIG. 6.

FIG. 6 illustrates the far-field photometric profile of a light fixture produced comprising the components illustrate in FIG. 1 where the light redirecting element is a lenticular lens array with the lenticules aligned parallel to the array of LEDs at the edges. Different symmetrically scattering volumetric light scattering films were optically coupled to the lightguide and the angular far-field luminous intensity of the output from the light fixture was measured. The different volumetric light scattering films optically coupled to the lightguide range are a 10°×10° angular FWHM diffuser (ADF1010), a 20°×20° angular FWHM diffuser (ADF2020), a 35°×35° angular FWHM diffuser (ADF3535), and a 50°×50° angular FWHM diffuser (ADF5050). Table 5 summarizes the angular widths in degrees of the lobes and the angles of the peak luminous intensity from the vertical extracted from the data presented in FIG. 6. In two cases, ADF3535 and ADF5050, there is only one lobe for the direct and one lobe for the indirect when using the 50% maximum criteria for the FWHM angular width. The peak angles are the angles of peak luminous intensity of the side lobes (in degrees) from the vertical.

TABLE 5

|  | Indirect side lobe FWHM angular width | Direct side lobe FWHM angular width | Indirect side lobe peak | Direct side lobe peak | Angular Luminance Uniformity |
|---|---|---|---|---|---|
| ADF1010 | 55° | 45° | 123° | 45° | 47% |
| ADF2020 | 51° | 53° | 128° | 43° | 43% |
| ADF3535 | 140° (single lobe) | 75° (single lobe) | 133° | 38° | 54% |
| ADF5050 | 135° (single lobe) | 70° (single lobe) | 138° | 35° | 73% |

In one embodiment of this invention, the FWHM angular width of the side lobes of the luminous intensity from a light fixture comprising a light redirecting element is within a range of 40° to 145°. In the fixture measured for the data for FIG. 6, the peak angle of luminous intensity associated with the side lobes, in both the direct and indirect light output from the fixture with a light redirecting element, moves closer to the vertical or normal to the light output surface at the center of the fixture, thus closer to 0° and 180° for the direct and indirect light output, respectively.

In one embodiment of this invention, a light fixture comprises a light redirecting element and at least two light sources illuminating two edges of a lightguide comprising a volumetric light scattering film and a non-scattering region wherein the angular peaks of the direct side lobes are between 30° and 50° from the vertical or normal to the light output surface and the angular peaks of the indirect side lobes are between 120° and 150° from the vertical or normal to the light output surface.

Also shown in Table 5, the angular luminance uniformity for the direct illumination portion of light output from the light fixture over the range of angles between 0 degrees and the peak angle of luminous intensity is higher with the larger diffusion angles of ADF3535 and ADF5050. In one embodiment of this invention, a light fixture comprises a light redirecting element and at least two light sources illuminating two edges of a lightguide comprising a volumetric light scattering film and a non-scattering region wherein the angular luminance uniformity for the direct illumination portion of light output from the light fixture over the range of angles between 0 degrees and the peak angle of luminous intensity is greater than one selected from the group of 40%, 50%, 60%, 70%, 80% and 90%.

In another aspect, the present invention provides methods of lighting a surface. In some embodiments, a method of lighting a surface comprises providing a light emitting device comprising at least one light source, a lightguide operable to receive light from the at least one light source at a first location on the lightguide, at least one light extraction region optically coupled to the lightguide, a light emitting region and a substantially non-scattering region along a portion of the lightguide, transmitting light from the lightsource into the lightguide and extracting at least a portion of light from the lightguide for emission from the light emitting device through the light emitting region to the surface.

In some embodiments, a method of lighting a surface comprises providing a light emitting device comprising at least one light source, a lightguide operable to receive light from the at least one light source at a first location on the lightguide, at least one light extraction region optically coupled to the lightguide, a light emitting region and a substantially non-scattering region along a portion of the lightguide, transmitting light from the lightsource into the lightguide, extracting a first portion of light from the lightguide for emission from the light emitting device as an indirect light output and extracting a second portion of the light from the lightguide for emission from the light emitting device as a direct light output.

In some embodiments, the first portion of light is emitted from the at least one light extraction region. In some embodiments, the first portion of light is emitted from the light emitting region. In some embodiments, the second portion of light is emitted from the at least one light extraction region. In some embodiments, the second portion of light is emitted from the light emitting region.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $\frac{1}{20}^{th}$, $\frac{1}{10}^{th}$, $\frac{1}{5}^{th}$, $\frac{1}{3}^{rd}$, $\frac{1}{2}$, etc, or by rounded-off approximations thereof, within the scope of the invention unless otherwise specified.

The invention claimed is:

1. A suspended light fixture, comprising:
a first light source having a first optical axis;
a second light source having a second optical axis; and
a lightguide comprising an optical material that forms:
  a first surface operable to receive light from the first light source;
  a second surface different from and abutting the first surface, a surface normal of the second surface being substantially vertical when the light fixture is suspended;
  a third surface different from and abutting the second surface, different from the first surface, and operable to receive light from the second light source, wherein the second surface is disposed between the first surface and the third surface; and
  a fourth surface abutting the first and third surfaces, and in facing opposition to the second surface;
  at least one light extraction region optically coupled to a first portion of one of the second surface and the fourth surface of the lightguide;
  a substantially non-scattering region comprising substantially non-scattering surface portions of each of the second surface and the fourth surface, each of the non-scattering surface portions abutting both the first surface and the third surface, and being in facing opposition to one another, with a substantially non-scattering portion of the optical material of the lightguide therebetween, wherein the light extraction region is surrounded by the non-scattering region, wherein
  the non-scattering region forms a planar portion adjacent to each of the first and third surfaces, and contains the light received through the first and third surfaces by total internal reflection at the second and fourth surfaces, and
  at least one of the second surface, the fourth surface and the optical material disrupts the total internal reflection in the light extraction region such that light is emitted outwardly from both the second and fourth surfaces, the second and fourth surfaces being curved within at least part of the light extraction region.

2. The suspended light fixture of claim 1, wherein the first total width of the substantially non-scattering region in the first direction parallel to the optical axis of the at least one light source is greater than 10% of the total width of the lightguide in the first direction.

3. The suspended light fixture of claim 1, wherein the first total width of the substantially non-scattering region is greater than 20% of the total width of the lightguide in the first direction.

4. The suspended light fixture of claim 1, wherein the first total width of the substantially non-scattering region in the first direction parallel to the optical axis of the at least one light source is greater than 50% of the total width of the lightguide in the first direction.

5. The suspended light fixture of claim 1, wherein the substantially non-scattering region has a second total width in a second direction normal to the first direction greater than 5% of the total width of the lightguide in the second direction.

6. The suspended light fixture of claim 5, wherein the second total width in the second direction normal to the first direction is greater than 10% of the total width of the lightguide in the second direction.

7. The suspended light fixture of claim 5, wherein the second total width in the second direction normal to the first direction is greater than 20% of the total width of the lightguide in the second direction.

8. The suspended light fixture of claim 5, wherein the second total width of the substantially non-scattering region ranges from about 1 inch to about 100 inches.

9. The suspended light fixture of claim 1, wherein the second total width in the second direction normal to the first direction is greater than 50% of the total width of the lightguide in the second direction.

10. The suspended light fixture of claim 1, wherein the first total width of the substantially non-scattering region ranges from about 1 inch to about 100 inches.

11. The suspended light fixture of claim 1, wherein the substantially non-scattering region is observable by a viewer of the light emitting device.

12. The suspended light fixture of claim 1, wherein the lightguide is a panel.

13. The suspended light fixture of claim 1, the first light source comprising a plurality of light sources, wherein the lightguide is operable to receive light from the plurality of light sources at a plurality of locations along the first surface of the lightguide.

14. The suspended light fixture of claim 1, wherein the first surface and the third surface are in facing opposition.

15. The suspended light fixture of claim 1, wherein the at least one light extraction region has a first total width in the first direction parallel to the optical axis of the at least one light source less than 95% of the total width of the lightguide in the first direction.

16. The suspended light fixture of claim 15, wherein the at least one light extraction region has a second total width in a second direction normal to the first direction less than 95% of the total width of the lightguide in the second direction.

17. The suspended light fixture of claim 15, wherein the at least one light extraction region has a second total width in a second direction normal to the first direction less than 80% of the total width of the lightguide in the second direction.

18. The suspended light fixture of claim 15, wherein the at least one light extraction region has a second total width in a second direction normal to the first direction less than 60% of the total width of the lightguide in the second direction.

19. The suspended light fixture of claim 15, wherein the at least one light extraction region has a second total width in a second direction normal to the first direction less than 30% of the total width of the lightguide in the second direction.

20. The suspended light fixture of claim 1, wherein the at least one light extraction region has a first total width in the first direction parallel to the optical axis of the at least one light source less than 80% of the total width of the lightguide in the first direction.

21. The suspended light fixture of claim 1, wherein the at least one light extraction region has a first total width in the first direction parallel to the optical axis of the at least one light source less than 50% of the total width of the lightguide in the first direction.

22. The suspended light fixture of claim 1, wherein the at least one light extraction region has a first total width in the first direction parallel to the optical axis of the at least one light source less than 30% of the total width of the lightguide in the first direction.

23. The suspended light fixture of claim 1, wherein the at least one light extraction region has a first total width in the first direction parallel to the optical axis of the light source ranging from about 0.5 inches to about 100 inches.

24. The suspended light fixture of claim 23, wherein the at least one light extraction region has a second total width in a second direction normal to the first direction ranging from about 0.5 inches to about 100 inches.

25. The suspended light fixture of claim 1, wherein the total area of the light extraction region is less than about 95% of the total area of the lightguide.

26. The suspended light fixture of claim 1, wherein the total area of the light extraction region is less than about 80% of the total area of the lightguide.

27. The suspended light fixture of claim 1, wherein the total area of the light extraction region is less than about 60% of the total area of the lightguide.

28. The suspended light fixture of claim 1, wherein the total area of the light extraction region is less than about 30% of the total area of the lightguide.

29. The suspended light fixture of claim 1, wherein the at least one light extraction region has a cross-sectional shape in a plane parallel to the optical axis of the at least one light source selected from the group consisting of circular, elliptical, square, rectangular, polygonal, amoeba like, partially curved, straight, ring and combinations thereof.

30. The suspended light fixture of claim 1 comprising a plurality of light extraction regions optically coupled to the lightguide.

31. The suspended light fixture of claim 30, wherein the plurality of light extraction regions are discontinuous with one another.

32. The suspended light fixture of claim 31, wherein the substantially non-scattering region is disposed between the plurality of discontinuous light extraction regions.

33. The suspended light fixture of claim 1, wherein the at least one light extraction region comprises a volumetric light scattering element, a surface relief light scattering element or a combination thereof.

34. The suspended light fixture of claim 1, wherein the at least one light extraction region comprises a volumetric light scattering region comprising asymmetrically shaped dispersed phase domains of a first polymer within a matrix of a second polymer.

35. The suspended light fixture of claim 34, wherein the volumetric light scattering element isotropically scatters light received from the lightguide.

36. The suspended light fixture of claim 34, wherein the volumetric light scattering element anisotropically scatters light received from the lightguide.

37. The suspended light fixture of claim 33, wherein the volumetric light scattering element or the surface relief light scattering element has a haze of greater than 50% according to ASTM D1003.

38. The suspended light fixture of claim 1, wherein the surface normal of the second surface forms an angle of between 0 and 30 degrees with respect to nadir where each of the non-scattering surface portions abut the first and third surfaces.

39. The suspended light fixture of claim 1, wherein a curvature of the second and fourth surfaces within the light extraction region is downwardly concave.

40. The suspended light fixture of claim 1, wherein a curvature of the second and fourth surfaces within the light extraction region is downwardly convex.

41. The suspended light fixture of claim 1, wherein the lightguide is suspended within a frame that has outer dimensions of 10 inches by 48 inches in plan view, and the light extraction region has a width of 4.5 inches.

42. The suspended light fixture of claim 1, wherein the lightguide is suspended within a frame that forms a reflector to provide mechanical support for the lightguide, the frame further comprising a light absorbing material between the second surface and the reflector, without a light absorbing material between the fourth surface and the reflector.

43. A suspended light fixture comprising:
a plurality of light sources including at least first and second light sources;
a lightguide comprising an optical material that forms:
 a first surface operable to receive light from the first light source;
 a second surface different from and abutting the first surface; and
 a third surface different from and abutting the second surface, in facing opposition to the first surface, and operable to receive light from the second light source, wherein the second surface is disposed between the first surface and the third surface;
at least one light extraction region being optically coupled to the second surface of the lightguide;
a substantially non-scattering region being disposed between the light blocking region and the light extraction region on the second surface;
the substantially non-scattering region comprising substantially non-scattering surface portions of each of the second surface and a fourth surface in facing opposition to the second surface, each of the non-scattering surface portions abutting both the first surface and the third surface, and being in facing opposition to one another, with a substantially non-scattering portion of the optical material of the lightguide therebetween, such that the second and fourth surfaces contain light introduced through the first and third surfaces in a total internal reflection condition,
the light extraction region being configured such that one of the second surface, the fourth surface, and the optical material disrupts the total internal reflection condition such that portions of the light are emitted from both the second and fourth surfaces; and a frame that:
- provides mechanical support for the lightguide,
- forms a reflector disposed to receive light from the first and second light sources that does not satisfy the total internal reflection condition, and
- includes a light absorbing region between the second surface and the reflector, that absorbs all light from the first and second light sources that does not directly couple into the lightguide in the total internal reflection condition at the second surface, without a light absorbing region between the fourth surface and the reflector.

44. The suspended light fixture of claim 43, wherein the light sources comprise light emitting diodes.

45. The suspended light fixture of claim 43, the light absorbing region comprising a light absorbing material that is separated from the second surface by an air gap, such that light within the lightguide in the total internal reflection condition does not couple into the light absorbing material.

46. The suspended light fixture of claim 43, the frame extending beneath a portion of the second surface of the lightguide to provide the mechanical support, but not extending over any portion of the fourth surface of the lightguide.

* * * * *